United States Patent
Sawada et al.

(10) Patent No.: US 9,445,357 B2
(45) Date of Patent: Sep. 13, 2016

(54) WIRELESS COMMUNICATION SYSTEM, WIRELESS COMMUNICATION METHOD, MOBILE STATION DEVICE, AND BASE STATION DEVICE

(71) Applicant: Sharp Kabushiki Kaisha, Osaka-shi, Osaka (JP)

(72) Inventors: Shinichi Sawada, Osaka (JP); Katsutoshi Ishikura, Osaka (JP); Shigeto Suzuki, Osaka (JP); Yuhsuke Takagi, Osaka (JP); Shumpei Fuse, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 130 days.

(21) Appl. No.: 14/411,629

(22) PCT Filed: Jul. 4, 2013

(86) PCT No.: PCT/JP2013/068431
§ 371 (c)(1),
(2) Date: Dec. 29, 2014

(87) PCT Pub. No.: WO2014/007351
PCT Pub. Date: Jan. 9, 2014

(65) Prior Publication Data
US 2015/0163728 A1    Jun. 11, 2015

(30) Foreign Application Priority Data

Jul. 4, 2012   (JP) .................................. 2012-150445

(51) Int. Cl.
*H04W 4/00*      (2009.01)
*H04W 48/16*     (2009.01)
(Continued)

(52) U.S. Cl.
CPC ............. *H04W 48/16* (2013.01); *H04W 28/22* (2013.01); *H04W 36/08* (2013.01)

(58) Field of Classification Search
USPC ........ 455/436–439, 442–445, 447–453, 464, 455/59–65; 370/328–334, 342–344
See application file for complete search history.

(56) References Cited

U.S. PATENT DOCUMENTS

| | | | | |
|---|---|---|---|---|
| 2010/0159927 A1* | 6/2010 | Toda | ...................... | H04W 48/16 455/435.2 |
| 2012/0044910 A1* | 2/2012 | Maeda | .................. | H04L 5/0005 370/332 |

(Continued)

FOREIGN PATENT DOCUMENTS

| WO | 2008/041573 A1 | 4/2008 |
|---|---|---|
| WO | 2010/125769 A1 | 11/2010 |

OTHER PUBLICATIONS

Official Communication issued in International Patent Application No. PCT/JP2013/068431, mailed on Aug. 20, 2013.

(Continued)

*Primary Examiner* — Dai A Phuong
(74) *Attorney, Agent, or Firm* — Keating & Bennett, LLP

(57) ABSTRACT

A wireless communication system includes a plurality of base station devices, and a mobile station device configured to communicate with the plurality of base station devices. The mobile station device includes: a necessity determining unit configured to refer to a communication state of a first base station device that is a base station device in communication with the mobile station device, and determine necessity of carrier aggregation; a cell search unit configured to, in a case that the necessity determining unit determines that carrier aggregation is necessary, search a communication available base station device from the plurality of base station devices; and a carrier aggregation requesting unit configured to, in a case that at least one communication available base station device is detected by the search, transmit a request for carrier aggregation to the first base station device, thus providing a wireless communication system that can obtain an excellent speed.

10 Claims, 21 Drawing Sheets

(51) Int. Cl.
*H04W 28/22* (2009.01)
*H04W 36/08* (2009.01)

(56) References Cited

U.S. PATENT DOCUMENTS

| | | | | |
|---|---|---|---|---|
| 2012/0099466 A1* | 4/2012 | Aoyama | ............... | H04L 5/001 370/252 |
| 2012/0178451 A1* | 7/2012 | Kubota | ............... | H04W 8/00 455/436 |
| 2015/0003348 A1* | 1/2015 | Ishii | ............... | H04L 27/2601 370/329 |
| 2015/0029984 A1* | 1/2015 | Wang | ............... | H04L 5/003 370/329 |
| 2015/0124729 A1* | 5/2015 | Lee | ............... | H04L 5/001 370/329 |
| 2015/0124760 A1* | 5/2015 | Seo | ............... | H04L 1/1861 370/329 |
| 2015/0172028 A1* | 6/2015 | Nam | ............... | H04L 1/0025 370/329 |
| 2015/0237607 A1* | 8/2015 | Frederiksen | ............... | H04L 5/0053 370/329 |
| 2016/0029363 A1* | 1/2016 | Kim | ............... | H04L 5/0007 370/329 |
| 2016/0100388 A1* | 4/2016 | Frenne | ............... | H04L 5/001 370/330 |

OTHER PUBLICATIONS

3GPP TS 36.300, V11.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Dec. 2011, pp. 1-194.

* cited by examiner

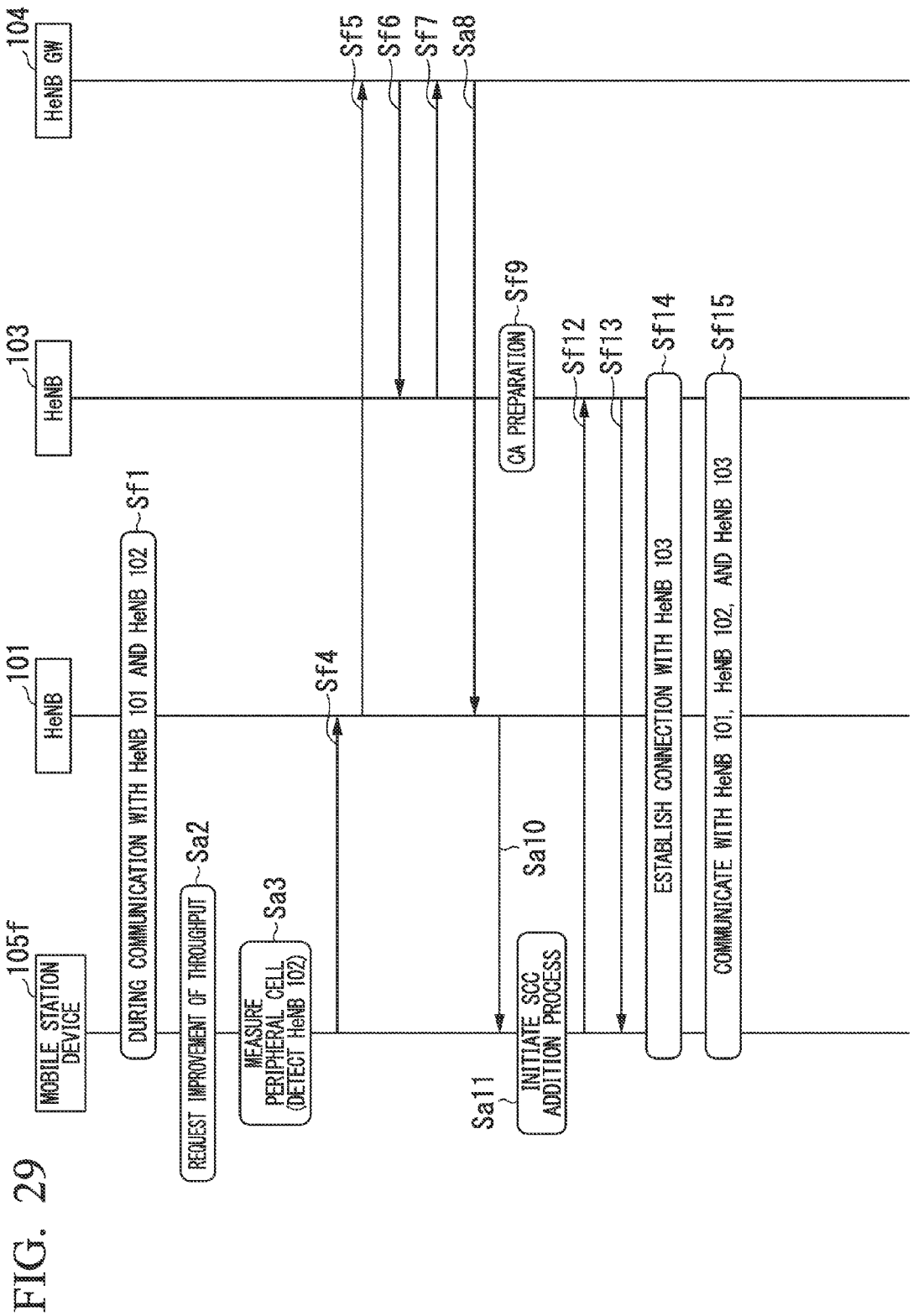

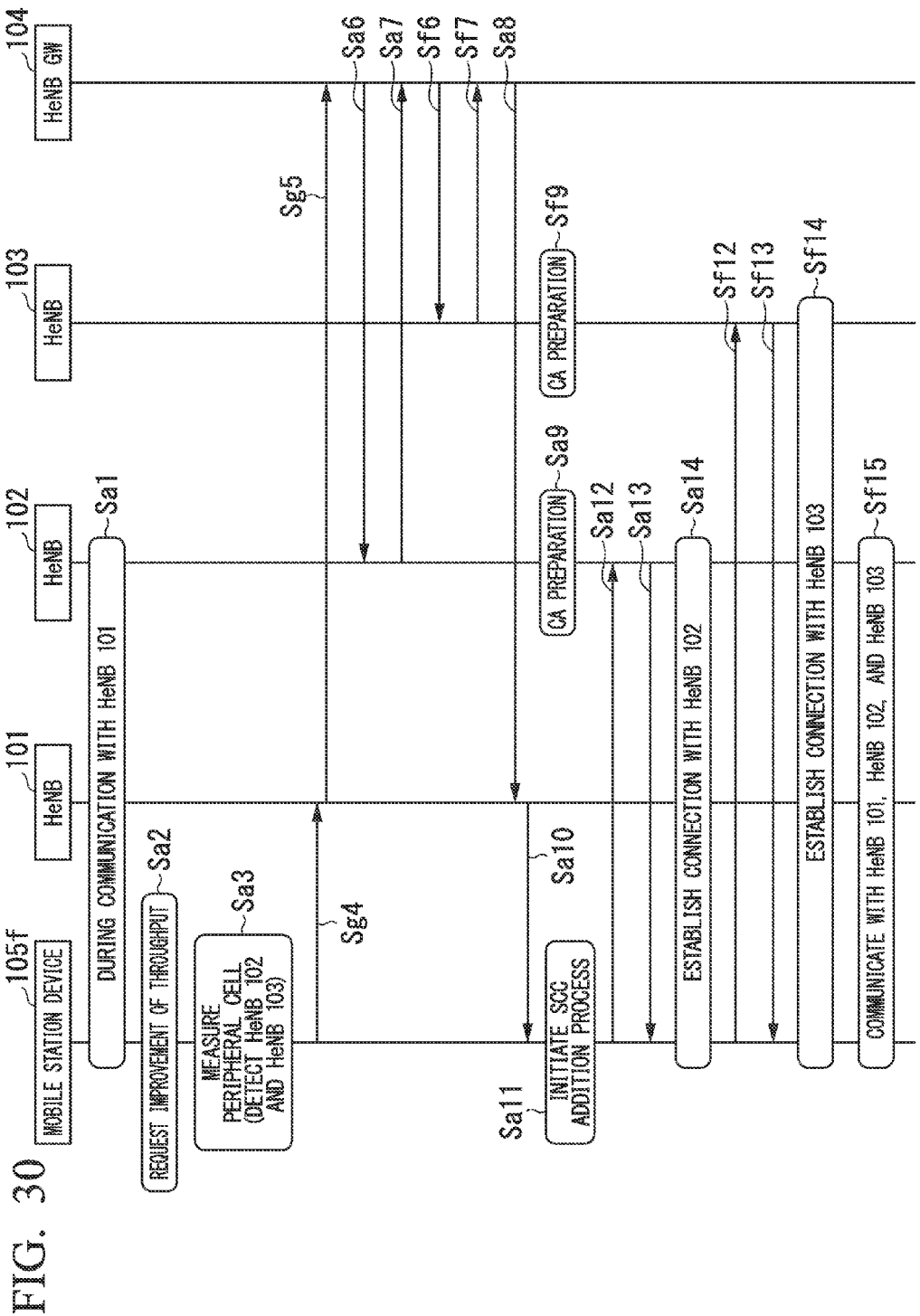

WIRELESS COMMUNICATION SYSTEM, WIRELESS COMMUNICATION METHOD, MOBILE STATION DEVICE, AND BASE STATION DEVICE

TECHNICAL FIELD

The present invention relates to a wireless communication system, a wireless communication method, a mobile station device, and a base station device.

Priority is claimed on Japanese Patent Application No. 2012-150445, filed Jul. 4, 2012, the content of which is incorporated herein by reference.

BACKGROUND ART

In 3GPP (3rd Generation Partnership Project), currently, specifications of LTE-A (Long Term Evolution-Advanced) are studied. LTE-A has been requested to realize higher-speed communication than LTE. Therefore, it has been decided that LTE-A supports a wider band (beyond the 20 MHz band of LTE, up to the 100 MHz band) than LTE.

In LTE-A, carrier aggregation (CA: Career Aggregation) technology is employed for the purpose of maintaining compatibility with LTE as much as possible. The carrier aggregation technology is a technology such that a plurality of frequency bands each having a bandwidth up to 20 MHz, which are called component carriers (CC), are used to collectively perform communication, thereby ensuring a bandwidth up to 100 MHz, and thus realizing high speed communication with large capacity (see section 5.5 of Non-Patent Document 1).

Regarding the CA, depending on use of frequency bands to be used, there are three methods.

(1) the same contiguous frequency bands are used (Intra-band Contiguous CA).

(2) the same dispersed frequency bands are used (Intra-band Non-Contiguous CA).

(3) Different frequency bands are used (Inter-band Non-Contiguous CA).

A conventionally-studied CA technology is a CA technology among mobile stations and one macrocell base station. The CA communication technology has a feature that PUCCH (Physical Uplink Control Channel) is transmitted from a mobile station using one CC. The agreement that PUCCH is transmitted using one CC has been made for the two following reasons.

If PUCCH is transmitted using a plurality of CCs, PAPR (Peak to Average Power Ratio) and current consumption increase, and the load on a battery of the mobile station increases. For this reason, PUCCH is transmitted using one CC.

In a case where the same contiguous frequency bands are used (above (1)), bands used to transmit PUCCH are adjacent to each other, thereby occasionally causing a spurious signal to be generated. For this reason, PUCCH is transmitted using either one of CCs.

CC used to transmit PUCCH is defined as a PCC (Primary Component Carrier), and CC not used to transmit PUCCH is defined as SCC (Secondary Component Carrier). Additionally, it has been agreed not to transmit PRACH (Physical Random Access Channel) in SCC. In other words, the CA communication here refers to a communication system in which a plurality of frequency bands are used to perform transmission and reception, but PUCCH is transmitted using only one CC.

In multicarrier communication, such as cooperative communication (COMP; also referred to as Coordinated Multi-Point Transmission/reception) or MIMO (Multiple Input Multiple Output), PUCCH can be transmitted from each of a plurality of antennas of a mobile station, that is, using respective ones of a plurality of frequency bands. For this reason, there has been no concept, such as PCC/SCC defined in the carrier aggregation, and it has been possible to use the same signal in two frequency bands independently.

Additionally, in the conventional multicarrier communication, in a case where a new frequency band is added, PRACH (Physical Random Access Channel) is transmitted using that frequency band to be added, synchronization is performed, and a connection process is performed, thus adding the frequency band. It has been possible to use a PRACH signal in any frequency band independently.

In the CA communication, the connection process is also different from that for the multi-carrier communication, and it is limited to PCC, which is a first frequency band, that can use a PRACH signal (see Section 7.5 of Non-Patent Document 1).

CITATION LIST

Non-Patent Document

[Non-Patent Document 1] 3GPP TS 36.300 v11.0.0 (2011-12)

DISCLOSURE OF THE INVENTION

Problems to be Solved by the Invention

However, in the above-described carrier aggregation, aggregatable component carriers are limited to those transmitted and received by one base station device, thereby causing a problem that a sufficient transmission speed cannot be obtained in some cases.

The present invention has been made in view of such circumstances, and has an object to provide a wireless communication system, a wireless communication method, a mobile station device, and a base station device, which can achieve an excellent transmission speed.

Means for Solving the Problems (1) The present invention has been made to solve the above problem. A wireless communication system according to one aspect of the present invention includes: a plurality of base station devices; and a mobile station device configured to communicate with the plurality of base station devices. The mobile station device includes: a necessity determining unit configured to refer to a communication state of a first base station device that is a base station device in communication with the mobile station device, and determine necessity of carrier aggregation; a cell search unit configured to, in a case that the necessity determining unit determines that carrier aggregation is necessary, search a communication available base station device from the plurality of base station devices; and a carrier aggregation requesting unit configured to, in a case that at least one communication available base station device is detected by the search, transmit a request for carrier aggregation to the first base station device.

(2) Additionally, regarding the above-described wireless communication system according to another aspect of the present invention, the mobile station device includes an accessibility determining unit configured to, in a case that a communication available base station device is detected by the search, determine whether or not the mobile station device is accessible to the detected base station device. The carriage aggregation requesting unit is configured to transmit the request for carrier aggregation to the first base station device in a case that a communication available base station device is detected by the search, and the accessibility determining unit determines that the mobile station device is accessible to the detected base station device.

(3) Further, regarding the above-described wireless communication system according to another aspect of the present invention, the mobile station device includes a peripheral base station information acquirer configured to acquire from the first base station device, information regarding a peripheral base station device capable of performing carrier aggregation. The cell search unit is configured to, at the time of the search, refer to the information regarding the peripheral base station device, which is acquired by the peripheral base station information acquirer.

(4) Moreover, regarding the above-described wireless communication system according to another aspect of the present invention further includes a base station management device accessibly connected to the plurality of base station devices. The base station management device includes a base station information acquirer configured to, in accordance with a request from the base station device, transmit information indicating a carrier aggregation available base station device among peripheral base station devices peripheral to the base station device having transmitted the request. The first base station device includes: a peripheral base station information acquirer configured to request and acquire from the base station device management device, information indicating a carrier aggregation available base station device among peripheral base station devices peripheral to the base station device; and a peripheral base station information provider configured to provide to the mobile station device, the information indicating the carrier aggregation available base station device, which is acquired by the peripheral base station information acquirer.

(5) Additionally, regarding the above-described wireless communication system according to another aspect of the present invention, the mobile station device includes a mobile station connection processor configured to, upon receiving from the first base station device, a response to the request, perform a connection process with the detected base station device.

(6) Further, regarding the above-described wireless communication system according to another aspect of the present invention, the request for carrier aggregation includes information indicating at least one of the detected base station devices. The first base station device includes a mobile station notifier configured to, upon receiving the request for carrier aggregation, transmit information indicating the mobile station device, to the base station device indicated by the information included in the request. The base station device includes base station connection processor configured to, upon receiving from the first base station device, the information indicating the mobile station device, perform a connection process with the mobile station device.

(7) Moreover, regarding the above-described wireless communication system according to another aspect of the present invention, the mobile station notifier is configured to, in a case that the information included in the request for carrier aggregation indicates a plurality of detected base station devices, transmit the information indicating the mobile station device to each of the plurality of detected base station devices.

(8) Additionally, regarding the above-described wireless communication system according to another aspect of the present invention, the necessity determining unit is configured to, in a case that the mobile station device is communicating with a second base station device in addition to the first base station device, refer to a communication state of the second base station device and determine necessity of carrier aggregation.

(9) Further, regarding the above-described wireless communication system according to another aspect of the present invention, the request for carrier aggregation is peripheral cell information used for handover to a home base station device, the peripheral cell information being added with a bit indicating that the peripheral cell information is for carrier aggregation.

(10) Moreover, a wireless communication method according to another aspect of the present invention is for a wireless communication system including a plurality of base station devices, and a mobile station device configured to communicate with the plurality of base station devices. The wireless communication method includes: a first step for the mobile station device to refer to a communication state of a first base station device that is a base station device in communication with the mobile station device, and determine necessity of carrier aggregation; a second step for the mobile station device to, in a case that it is determined in the first step that carrier aggregation is necessary, search a communication available base station device from the plurality of base station devices; and a third step for the mobile station device to, in a case that at least one communication available base station device is detected by the search, transmit a request for carrier aggregation to the first base station device.

(11) Additionally, a mobile station device according to another aspect of the present invention is configured to communicate with a plurality of base station devices. The mobile station device includes: a necessity determining unit configured to refer to a communication state of a first base station device that is a base station device in communication with the mobile station device, and determine necessity of carrier aggregation; a cell search unit configured to, in a case that the necessity determining unit determines that carrier aggregation is necessary, search a communication available base station device from the plurality of base station devices; and a carrier aggregation requesting unit configured to, in a case that at least one communication available base station device is detected by the search, transmit a request for carrier aggregation to the first base station device.

(12) Further, a base station device according to another aspect of the present invention is accessibly connected to a base station management device and is configured to wirelessly communicate with a mobile station device. The base station device includes: a peripheral base station information acquirer configured to request and acquire from the base station device management device, information indicating a carrier aggregation available base station device among peripheral base station devices peripheral to the base station device; and a peripheral base station information provider configured to provide to the mobile station device, the information indicating the carrier aggregation available base station device, which is acquired by the peripheral base station information acquirer.

Effects of the Invention

According to the present invention, it is possible to achieve an excellent transmission speed.

BRIEF DESCRIPTION OF THE DRAWINGS

FIG. 29 is a sequence diagram illustrating operation of a wireless communication system 100f according to the same embodiment.

FIG. 30 is a sequence diagram illustrating another operation of the wireless communication system 100f according to the same embodiment.

MODE FOR CARRYING OUT THE INVENTION

[First Embodiment]

Figure 1:
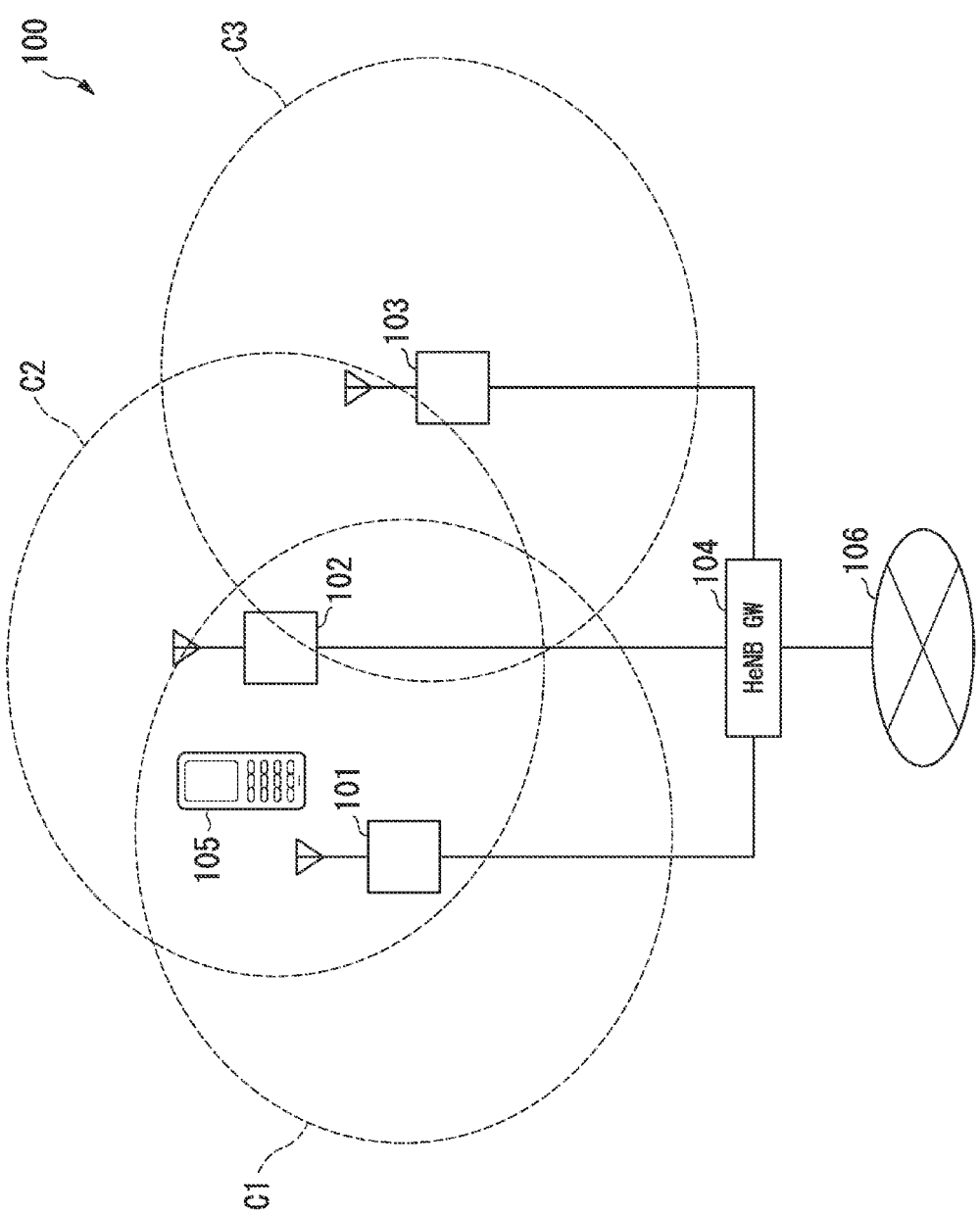
FIG. 1 is a schematic block diagram showing a configuration of a wireless communication system 100 according to a first embodiment of the present invention.

Hereinafter, a first embodiment of the present invention will be described with reference to drawings. FIG. 1 is a schematic block diagram showing a configuration of a wireless communication system 100 according to the first embodiment of the present invention. The wireless communication system 100 is configured to include HeNB (Home eNode B; also referred to as a home base station device, a low-power base station device, or a femtocell base station device) 101, HeNB 102, HeNB 103, HeNB GW (HeNB Gateway; also referred to as a home base station gateway) 104, and a mobile station device 105. HeNB 101 (a first base station device), HeNB 102, and HeNB 103 are base station devices respectively serving cells C1, C2, and C3 as communication coverages. The cells C1, C2, and C3 overlap one another. HeNB 101, HeNB 102, and HeNB 103 each uses a single frequency band to communicate with the mobile station device 105. These frequency bands are also referred to as component carriers, the maximum bandwidth of which is 20 MHz. Additionally, frequencies to be used by HeNB 101, HeNB 102, and HeNB 103 are different from one another. Here, each of HeNB 101, HeNB 102 and HeNB 103 may use different frequencies between in uplink and downlink.

HeNB GW 104 (a base station gateway) is accessibly connected to each of HeNB 101, HeNB 102, and HeNB 103 via an IP (Internet Protocol) network. In order to standardize transmission/reception timing control at the time of performing CA among HeNB 101, HeNB 102, HeNB 103 and the mobile station, HeNB GW 104 synchronizes, in frame units, the timings (transmission signals addressed to the mobile station device) for operation of HeNB 101, HeNB 102, and HeNB 103.

Additionally, HeNB GW 104 relays control signals among HeNB 101, HeNB 102, and HeNB 103. Further, HeNB GW 104 is connected to a core network 106, and transmits via any one of HeNB 101, HeNB 102, and HeNB 103, data received from the core network 106 and addressed to the mobile station device 105.

The mobile station device 105 performs wireless communication with HeNB 101, HeNB 102, and HeNB 103. Additionally, the mobile station device 105 performs carrier aggregation to simultaneously communicate with a plurality of HeNBs, such as HeNB 101 and HeNB 102. Here, description will be given hereinafter assuming that the mobile station device 105 performs carrier aggregation while regarding a cell served by HeNB 101 as a PCC (primary component carrier), and regarding a cell served by HeNB 102 as an SCC (secondary component carrier). Additionally, in the following description, a mobile station device with no reference numeral is occasionally described, and this represents that this is not limited to the mobile station device 105 and also includes other mobile station devices. Similarly, a description of a base station device or HeNB with no reference numeral represents that this is not limited to HeNB 101 to HeNB 103 and includes other base station devices or HeNBs.

Figure 2:
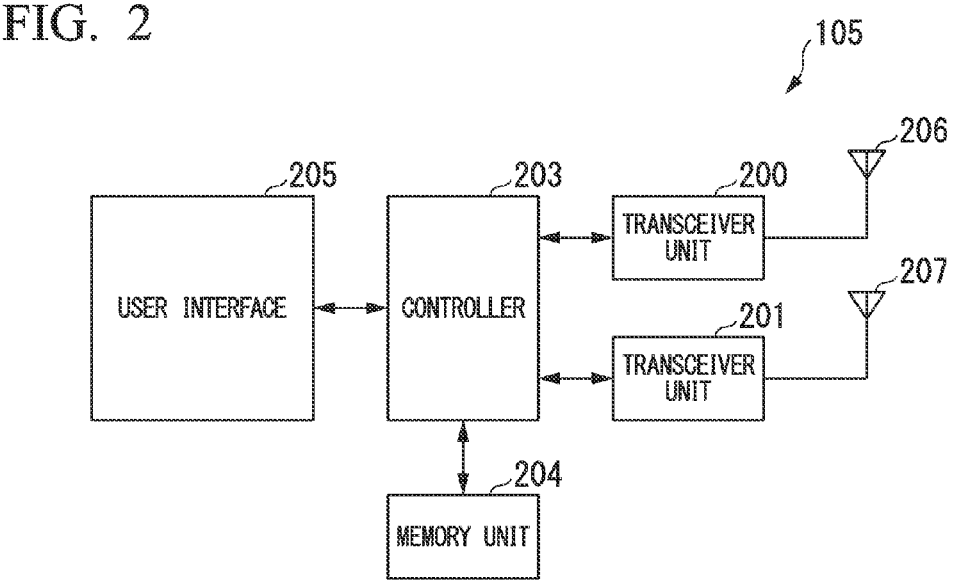
FIG. 2 is a schematic block diagram showing a configuration of a mobile station device 105 according to the same embodiment.

FIG. 2 is a schematic block diagram showing a configuration of the mobile station device 105. The mobile station device 105 includes two transceiver units 200 and 201, a controller 203, a memory unit 204, a user interface 205, two transceiver antennas 206 and 207. Using frequencies and bandwidths respectively specified by the controller 203, the transceiver units 200 and 201 perform wireless communication with HeNB 101, HeNB 102, and HeNB 103 via the transceiver antennas 206 and 207. Here, in the present embodiment, when carrier aggregation is not performed, that is, when communication is performed with one base station device, the transceiver unit 200 performs communication. Additionally, when carrier aggregation is performed, the transceiver units 200 and 201 use different frequency bands (component carriers) to communicate respectively with associated base station devices.

The controller 203 reads and executes a program stored by the memory unit 204, thereby controlling the entire mobile station device 105. The memory unit 204 stores a program to be executed by the controller 203, and data required to execute the program. The user interface 205 is a device to present and receive information to and from a user, such as a microphone, a speaker, a display, input keys, and a touch panel.

Figure 3:
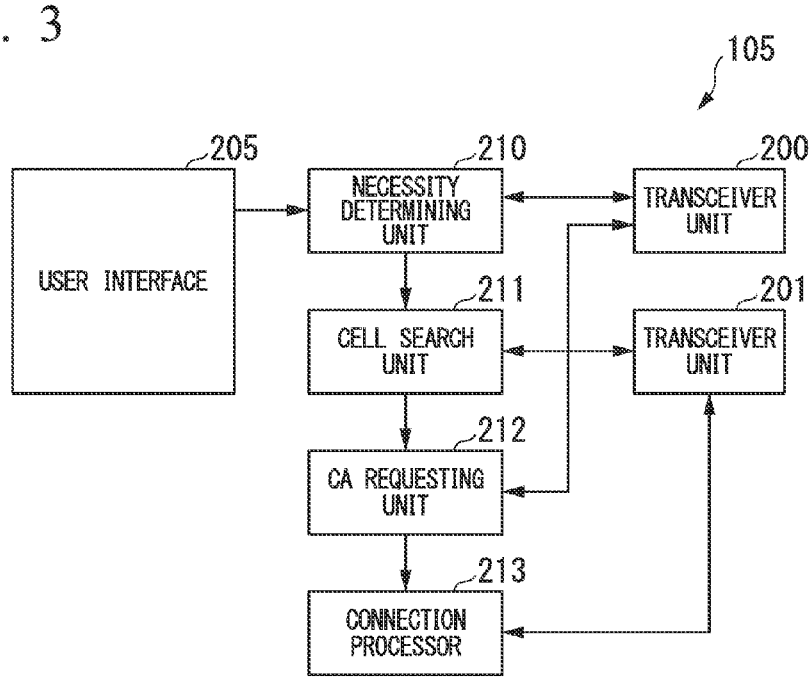
FIG. 3 is a schematic block diagram showing a part of a logical functional configuration of the mobile station device 105 according to the same embodiment.

FIG. 3 is a schematic block diagram showing a part of a logical functional configuration of the mobile station device 105. In the same figure, a necessity determining unit 210, a cell search unit 211, a CA requesting unit 212, and a connection processor 213 are realized by the controller 203 reading and executing the program stored by the memory unit 204. The necessity determining unit 210 determines necessity of carrier aggregation with reference to a communication state of a base station device (HeNB 101 in this case) in communication with the mobile station device 105. Alternatively, the necessity determining unit 210 may be configured to determine that carrier aggregation is necessary, when a user performs, via the user interface 205, input operation to request improvement of throughput or performance of carrier aggregation.

For example, the necessity determining unit 210 measures the uplink communication speed of the transceiver unit 200 being transmitting user data to HeNB 101 (throughput, communication data amount per unit time), and uses the measured uplink communication speed as a communication state. In this case, if a required uplink transmission speed is greater than the communication speed acquired as a result of the measurement, HeNB 101 determines that carrier aggregation is necessary. Otherwise, HeNB 101 determines that carrier aggregation is unnecessary. Here, the required uplink communication speed may be a value depending on a used service, such as 64 kbps for voice communication and 256 kbps for video phone. Alternatively, the required uplink communication speed may be a value specified by a user to the mobile station device 105. Alternatively, the required uplink communication speed may be specified by an application running on the mobile station device 105. Additionally, the necessity determining unit 210 may use, as the communication state, the amount of data stored by a buffer that stores user data to be transmitted in uplink. When the amount of data stored by the buffer exceeds a predetermined value, or when the increased amount per unit time exceeds a predetermined value, the necessity determining unit 210 determines that carrier aggregation is necessary.

When the necessity determining unit 210 determines that carrier aggregation is necessary, the cell search unit 211 searches a communication available base station device (also referred to as cell search or peripheral cell measurement). Specifically, the cell search unit 211 sequentially sets predetermined frequencies to the transceiver unit 201. Then, for each of the set frequencies, the cell search unit 211 acquires a signal received by the transceiver unit 201 at the frequency. The cell search section 211 detects from the acquired signal, a synchronization channel transmitted by the base station device, and measures the reception power thereof. If the reception power is equal to or greater than a predetermined value, the cell search unit 211 determines that the mobile station device 105 is located in the communication coverage of the base station device having transmitted the synchronization channel, and the base station device is a communication available base station device. Additionally, with respect to the base station device determined to be communication available, the cell search unit 211 receives and store broadcast information and system information which are transmitted by the base station device. Here, the cell search unit 211 may be configured to, with reference to the broadcast information and the system information, determine whether or not the detected base station device has a function of performing communication by carrier aggregation, and only if the detected base station device has that function, targets the base station device for carrier aggregation, that is, determines the base station device to be a communication available base station device. Here, the frequency that the cell search unit 211 sets to the transceiver unit 201 may be, for example, a frequency for a base station device handovered from the base station device currently in communication, or the base station device subjected to carrier aggregation with the base station device currently in communication.

Here, in the present embodiment, when the cell search unit 211 detects a plurality of communication available base station devices, the cell search unit 211 refers to the base station type or the reception power, and selects one of the communication available base station devices (HeNB 102 in this case). For example, in a case where the base station type is referred to, priority is given in the order of CSG (Closed Subscriber Group)_HeNB, Hybrid_HeNB, and OPEN_HeNB. Further, in the same base station type, a base station device with the higher reception power may be prioritized. Here, CSG_HeNB is HeNB accessible only by mobile station devices of specific subscribers registered to the base station. Additionally, OPEN_HeNB is HeNB that does not set such an access limit as set by CSG_HeNB. Hybrid_HeNB is a hybrid between CSG_HeNB and OPEN_HeNB, which is, for example, HeNB that preferentially allocates bands to mobile station devices of specific subscribers registered to the base station, and allocates the remaining bands to communication with other mobile station devices.

When the cell search unit 211 detects a communication available base station device by search, the CA requesting unit 212 transmits a request for carrier aggregation to a base station device (HeNB 101 in this case) in communication with the mobile station device. Here, the request for carrier aggregation includes information indicating the detected base station device (HeNB 102 in this case). Further, the CA requesting unit 212 outputs to the transceiver unit 200, a signal indicating the request for carrier aggregation, and has the transceiver unit 200 wirelessly transmit the signal, thereby notifying HeNB 101 of the request.

The connection processor 213 performs a connection process as SCC with a base station device. When the CA requesting unit 212 receives a response to the request for carrier aggregation, the connection processor 213 performs a connection process with the base station device (HeNB 102 in this case) detected by the cell search unit 211. Specifically, the connection processor 213 sets to the transceiver unit 201, a frequency used to communicate with HeNB 102. Then, the connection processor 213 transmits via the transceiver unit 201, a request for carrier aggregation connection (CA connection request) that requests HeNB 102 to establish connection as SCC. Here, this request for carrier aggregation connection is transmitted using a physical uplink shared channel (PUSCH). Thus, it is possible not to use a physical uplink control channel (PUCCH) and a physical random access channel (PRACH) between the mobile station device and HeNB 102 that establish connection as SCC.

Figure 4:
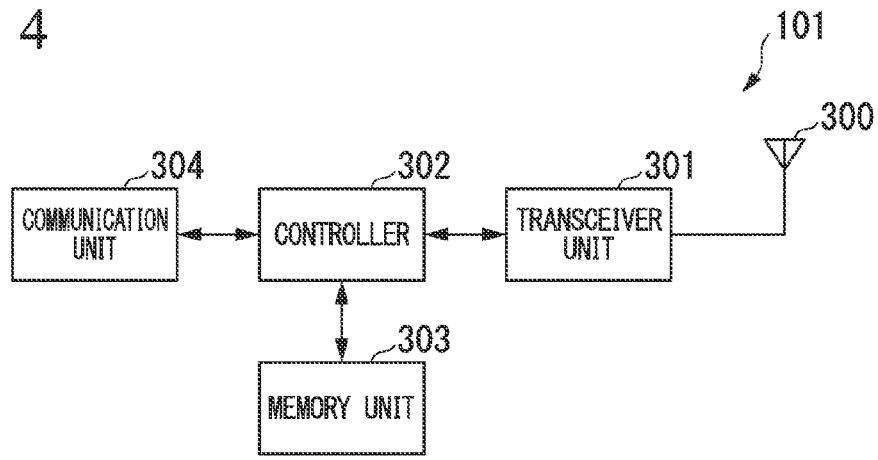
FIG. 4 is a schematic block diagram showing a configuration of HeNB 101 according to the same embodiment.

FIG. 4 is a schematic block diagram showing a configuration of HeNB 101. HeNB 102 and HeNB 103 have similar configurations to that of HeNB 101 except that frequency bands used for transmission and reception to and from the mobile station device are different, and therefore description thereof is omitted here. HeNB 101 is configured to include a transceiver unit 300, a transceiver unit 301, a controller 302, a memory unit 303, and a communication unit 304. Using a predetermined frequency band, the transceiver unit 301 performs wireless communication with the mobile station device 105 via the transceiver antenna 300. The controller 302 reads and executes the program stored by the memory unit 303, thus controlling the entire HeNB 101. The memory unit 303 stores a program to be executed by the controller 302, and data required to execute the program. The communication unit 304 communicates with HeNB GW 104.

Figure 5:
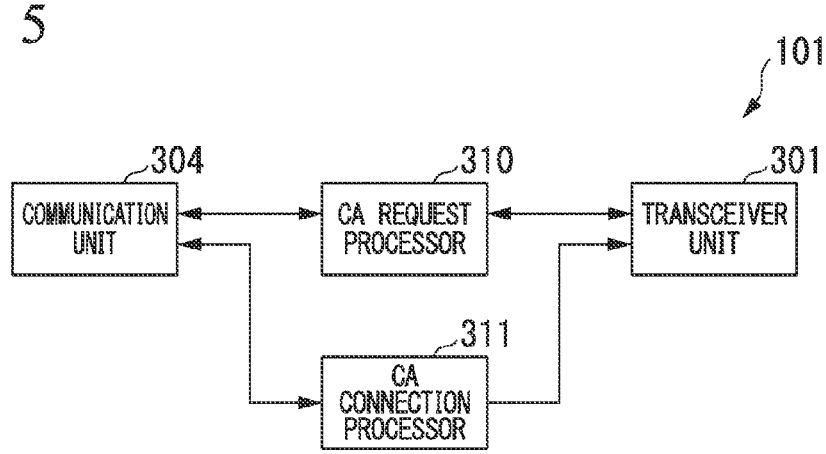
FIG. 5 is a schematic block diagram showing a part of a logical functional configuration of HeNB 101 according to the same embodiment.

FIG. 5 is a schematic block diagram showing a part of a logical functional configuration of HeNB 101. HeNB 102 and HeNB 103 have similar logical functional configurations to that of HeNB 101, and therefore description thereof is omitted here. In the same figure, the CA request processor 310 and the CA connection processor 311 are realized by the controller 302 reading and executing the program stored by the memory unit 303. Additionally, the CA request processor 310 and the CA connection processor 311 perform communication with HeNB GW 104 via the communication unit 304, and perform communication with the mobile station device via the transceiver unit 301.

Upon receiving a request for carrier aggregation from the mobile station device (the mobile station device 105 in this case), the CA request processor 310 transmits to HeNB GW 104, a request for carrier aggregation addressed to a base station device (HeNB 102 in this case) indicated by information included in the request. The request for carrier aggregation addressed to HeNB 102 includes identification information of the mobile station device 105 having requested the carrier aggregation. Upon receiving from HeNB GW 104, a response (ACK) to the request for carrier aggregation, the CA request processor 310 transmits a response (ACK) to the mobile station device 105.

Upon receiving the request for carrier aggregation from HeNB GW 104, the CA connection processor 311 returns a response (ACK). Then, the CA connection processor 311 performs a connection process to establish connection as SCC with a mobile station device indicated by the information included in the request. Specifically, the CA connection processor 311 enters a standby state for receiving a connection request from the mobile station device indicated by the information included in the request, and upon receiving the connection request, performs the connection process with the mobile station device. For example, in a case where HeNB 101 is connected as PCC to the mobile station device 105, and HeNB 102 establishes connection as SCC with the mobile station device 105, the CA connection processor 311 included in HeNB 102 performs the above operation. In other words, the CA connection processor 311 of HeNB 102 receives via the HeNB GW 104, a request for carrier aggregation issued by HeNB 101, and performs the connection process with the mobile station device 105.

Figure 6:
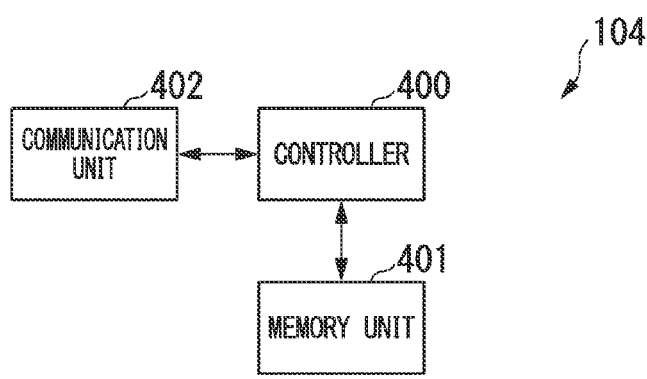
FIG. 6 is a schematic block diagram showing a configuration of HeNB GW 104 according to the same embodiment.

FIG. 6 is a schematic block diagram showing a configuration of HeNB GW 104. HeNB GW 104 is configured to include a controller 400, a memory unit 401, and a communication unit 402. The controller 400 reads and executes a program stored by the memory unit 401, thereby controlling the entire HeNB GW 104. The memory unit 401 stores a program to be executed by the controller 400, and data required to execute the program. The communication unit 402 communicates with other devices and HeNB 101 to HeNB 103, which are connected via the core network 106.

Figure 7:
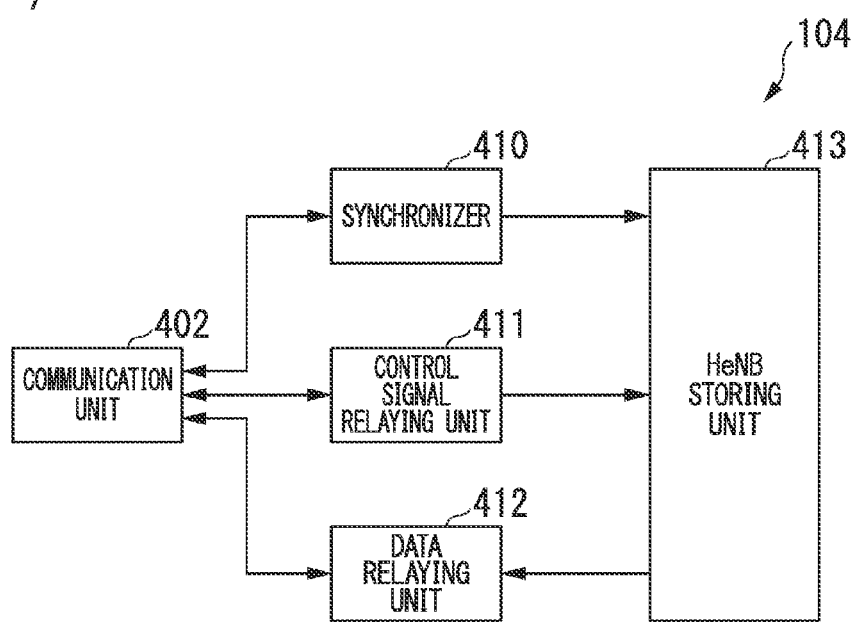
FIG. 7 is a schematic block diagram illustrating a part of a logical functional configuration of HeNB GW 104 according to the same embodiment.

FIG. 7 is a schematic block diagram showing a part of a logical functional configuration of HeNB GW 104. In the same figure, a synchronizer 410, a control signal relaying unit 411, a data relaying unit 412, and an HeNB storing unit 413 are realized by the controller 400 reading and executing the program stored by the memory unit 401. The HeNB storing unit 413 stores identification information of HeNB under control of HeNB GW 104, and identification information of the mobile station device connected to the HeNB, while associating those identification informations with each other.

The synchronizer 410 communicates via the communication unit 402 with HeNBs (HeNB 101 to HeNB 103 in this case) under the control of HeNB GW 104, and synchronizes wireless signals transmitted by those HeNBs. The control signal relaying unit 411 transmits a control signal (e.g., a request for carrier aggregation and a response thereto) transmitted from HeNB to another HeNB, which is received by the communication unit 304, to the other HeNB via the communication unit 304, thus relaying the control signal. Here, each HeNB specifies a transmission destination HeNB, and transmits each control signal to HeNB GW 104.

The control signal relaying unit 411 relays the control signal to the specified transmission destination HeNB.

When the communication unit 402 receives data transmitted from another device connected via the core network 106 to the mobile station device, the data relaying unit 412 refers to the HeNB storing unit 413 and transmits, via the communication unit 402, the data to HeNB connected to the mobile station device. Here, when there is a plurality of HeNBs connected to the mobile station device, that is, when carrier aggregation is performed, the data relaying unit 412 divides the data. Then, the data relaying unit 412 transmits the respective divided data to HeNBs determined by, for example, the round-robin method or the like. Additionally, the data relaying unit 412 forwards transmission data transmitted from the mobile station device and received by the communication unit 402, to the destination of the transmission data, via the communication unit 402 and the core network 106. When carrier aggregation is performed, the communication unit 402 receives transmission data from the mobile station device 105 via a plurality of HeNBs. However, the data relaying unit 412 collectively forwards those transmission data to the transmission destination of the transmission data.

Figure 8:
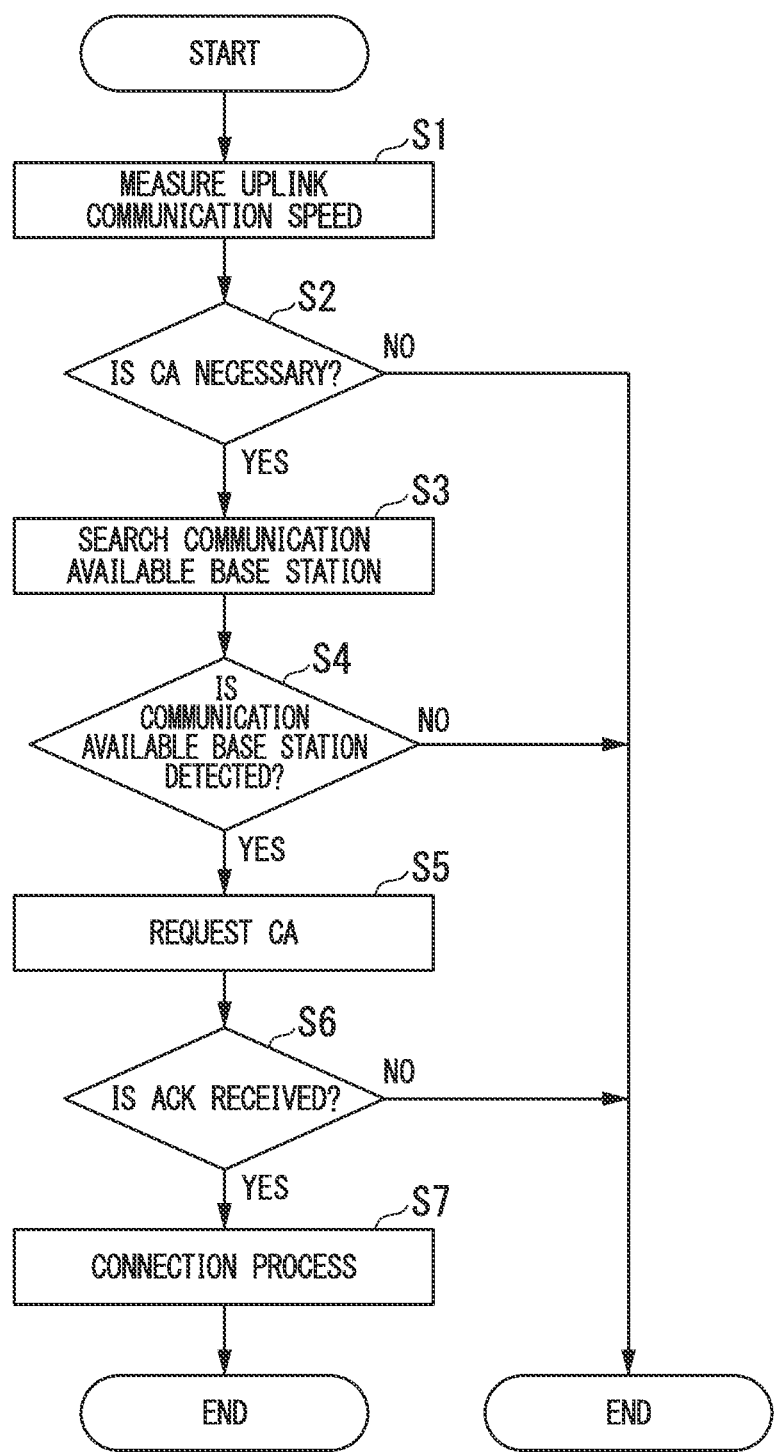
FIG. 8 is a flowchart illustrating operation of the mobile station device 105 according to the same embodiment.

FIG. 8 is a flowchart illustrating operation of the mobile station device 105 according to the present embodiment. The mobile station device 105 periodically performs the process shown in the flowchart of FIG. 8. First, the uplink necessity determining unit 210 measures an uplink communication speed (S1). Then, the necessity determining unit 210 determines necessity of carrier aggregation with reference to the uplink communication speed acquired as a result of the measurement (S2). More specifically, the necessity determining unit 210 compares the uplink communication speed as the result of the measurement and the required uplink communication speed. If the required communication speed is larger than the measured uplink communication speed, the necessity determining unit 210 determines that carrier aggregation is necessary. If the necessity determining unit 210 determines that carrier aggregation is unnecessary (S2—No), the process ends with no further process.

On the other hand, if it is determined in step S2 that carrier aggregation is necessary (S2—Yes), the cell search section 211 searches a communication available base station device (S3). If no communication available base station device is detected by the search (S4—No), the process ends with no further process. On the other hand, if a communication available base station device is detected (S4—Yes), the CA requesting unit 212 transmits a request for carrier aggregation to a base station device (HeNB 101 in this case) in communication with the mobile station device 105 at that time (S5). Here, the CA requesting unit 212 includes in the request for carrier aggregation, identification information of the base station device (HeNB 102 in this case) detected by the search in step S3.

If the CA requesting unit 212 does not receive a response to the request for carrier aggregation transmitted in the step S5 even after a predetermined time has passed, or if the CA requesting unit 212 receives a negative response (NACK) to the request (S6—No), the process ends with no further process. Additionally, if a response (ACK) to the request is received (S6-Yes), the connection processor 213 performs with the base station device, a connection process of establishing connection with the base station device detected in step S3 (HeNB 102 in this case) as SCC (S7).

Figure 9:
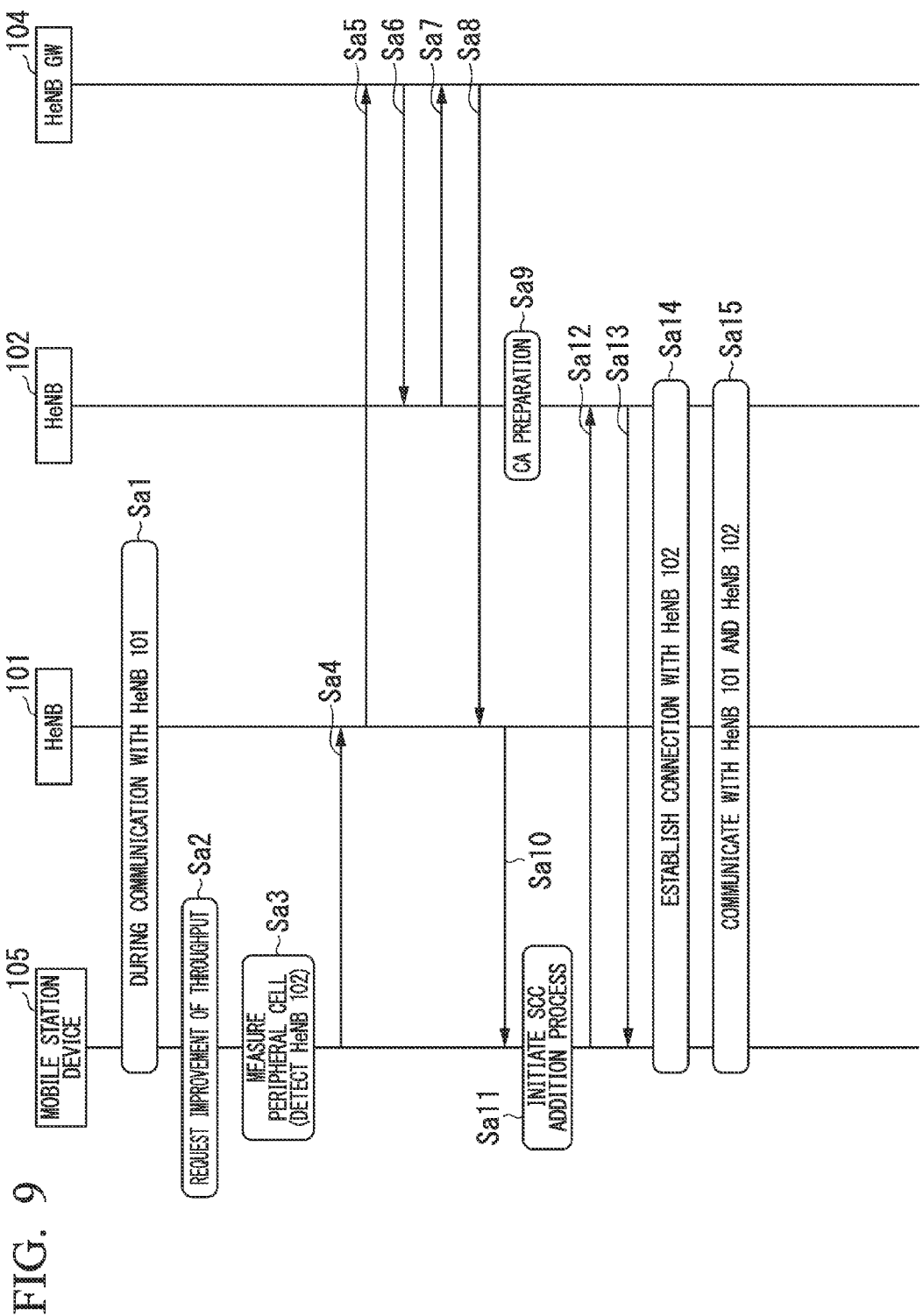
FIG. 9 is a sequence diagram illustrating operation of the wireless communication system 100 according to the same embodiment.

FIG. 9 is a sequence diagram illustrating operation of the wireless communication system 100 according to the present embodiment. Here, communication among HeNB 101, HeNB 102, and HeNB GW 104 is performed via the communication units 304 and 402 of the respective devices, but description thereof is omitted hereinafter. First, it is assumed that when the mobile station device 105 is communicating with HeNB 101 (Sa1), the necessity determining unit 210 determines that improvement of the throughput, that is, carrier aggregation, is necessary (Sa2).

Then, the cell search unit 211 sets a frequency to measure peripheral cells, to the transceiver unit 201 not in use at that time, and performs measurement of peripheral cells. Here, at this time, the cell search unit 211 may select a base station device to be measured, based on the past camping history of the mobile station device 105, current location information thereof, and the like. In this case, the frequency to be set to the transceiver unit 201 is set to be a frequency to be used by the selected base station device. Here, it is assumed that the cell search unit 211, by the measurement of peripheral cells, has detected HeNB 102 as a communication available base station device (Sa3). Here, the fact that the cell search unit 211 has detected HeNB 102 as a communication available base station device means that the mobile station device 105 is located within the service area of both HeNB 101 and HeNB 102.

The CA requesting unit 212 transmits to HeNB 101, a request for carrier aggregation (CA Request) including information to identify HeNB 102 detected in the sequence Sa3 (Sa4). Upon receiving the request for carrier aggregation, the CA request processor 310 of HeNB 101 transmits to the HeNB GW 104, a request for carrier aggregation (CA request) with respect to HeNB 102, which is indicated by information included in the request (Sa5). Here, the CA request processor 310 includes in the request for carrier aggregation with respect to HeNB 102, information to identify the mobile station device 105 having requested the carrier aggregation, and transmits the request. Upon receiving the request for carrier aggregation, the control signal relaying unit 411 of HeNB GW 104 forwards the request to HeNB 102 (Sa6). Here, at this time, when HeNB 101 and HeNB 102 are not synchronized, the synchronizer 410 of HeNB GW 104 may be configured to synchronize those HeNB 101 and HeNB 102. Additionally, communication between HeNB 101 and HeNB 102 may be performed using an S1 interface passing via HeNB GW 104 as in this case, or an X2 interface to be used for direct communication. Alternatively, an X2 interface that is an interface between base stations may be relayed by HeNB GW 104.

Upon receiving the request for carrier aggregation, the CA connection processor 311 of HeNB 102 returns a response (ACK) to HeNB 101 via HeNB GW 104 (Sa7, Sa8). Additionally, the CA connection processor 311 prepares to establish connection with the mobile station device 105 identified by the information included in the request, and thus enters a state of waiting for a connection request from the mobile station device 105 (Sa9).

Upon receiving the response in the sequence Sa8, the CA request processor 310 of HeNB 101 transmits a response (CA request response, ACK) to the mobile station device 105 (Sa10). This response is a response to the request for carrier aggregation in the sequence Sa4. For the mobile station device 105, the response means that HeNB 101 and HeNB 102 allow the mobile station device 105 to perform carrier aggregation while regarding HeNB 101 and HeNB 102 respectively as PCC and SCC. Upon receiving this response, the connection processor 213 of the mobile station device 105 initiates a process of adding SCC (Sa11). To add HeNB 102 as SCC, the connection processor 213 transmits to HeNB 102, a request for carrier aggregation connection (CA connection request) (Sa12). The connection processor 213 transmits the CA connection request (data communication initiation message) using PUSCH. Here, since HeNB 101 and HeNB 102 are synchronized by HeNB GW 104, the transceiver unit 201 transmits the CA connection request to HeNB 102 using the timing synchronized with HeNB 101 by the transceiver unit 200.

Upon receiving the request for carrier aggregation connection, the CA connection processor 311 of HeNB 102, which has been in the state of waiting for a connection request from the mobile station device 105, returns a response thereto (ACK) to the mobile station device 105, using PDSCH (Physical Downlink Shared Channel) or PDCCH (Physical Downlink Control Channel) (Sa13). Here, the CA connection processor 311 receiving this request for carrier aggregation connection can simplify the connection process by the following two points. The first point is that when a CA request is received in the sequence Sa6, the identification information of the mobile station device 105 is registered to HeNB 102 by the CA connection processor 311. The second point is that since HeNB 101 and HeNB 102 are synchronized by HeNB GW 104, the mobile station device 105 synchronized with HeNB 101 has already been synchronized also with HeNB 102.

Thus, the connected mobile station device 105 becomes connected to HeNB 102 (Sa14), and communicates with HeNB 101 and HeNB 102 (Sa15). Here, at this time, HeNB 101 is connected as PCC to the mobile station device 105, and HeNB 102 is connected as SCC to the mobile station device 105.

Figure 10:
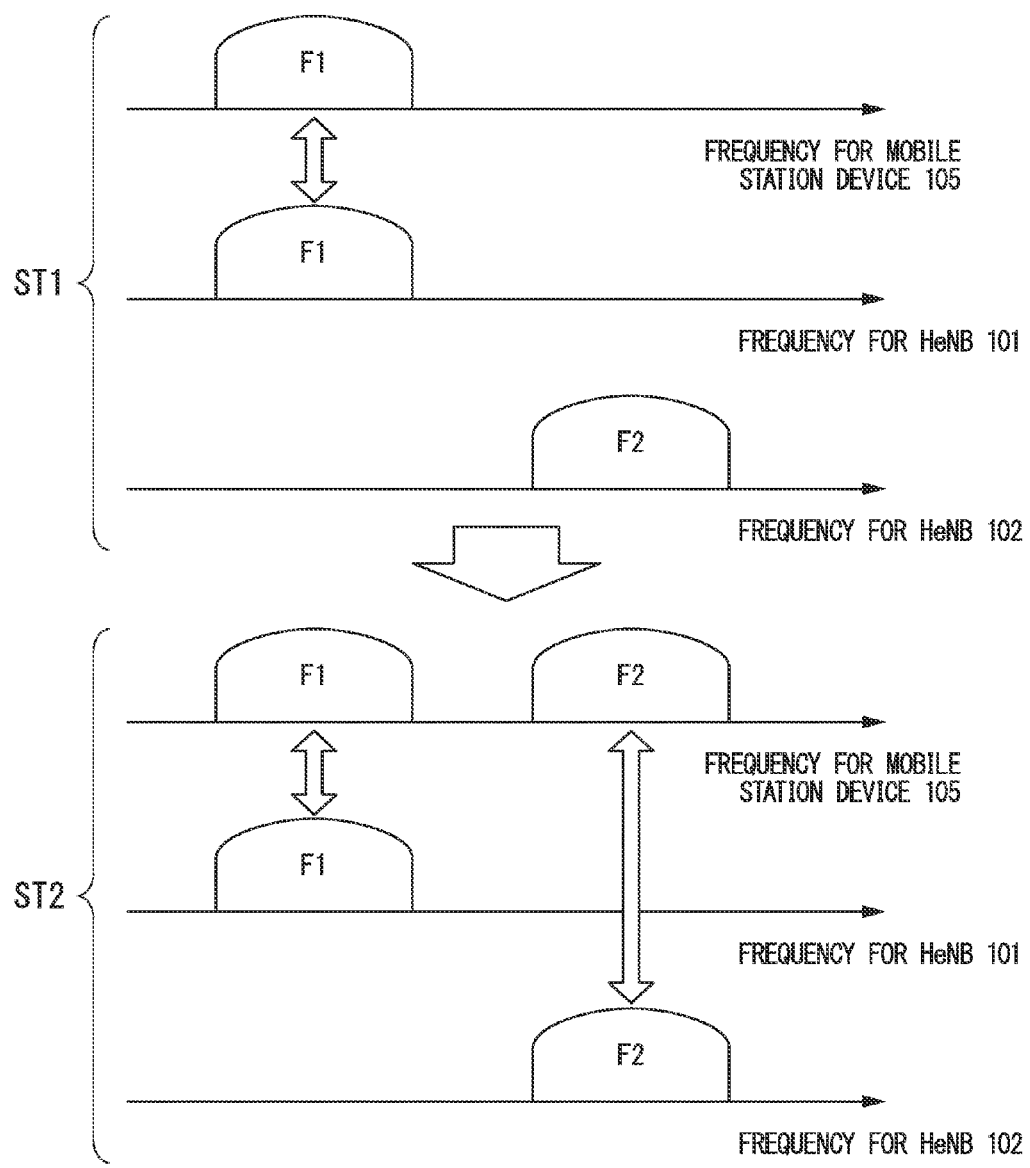
FIG. 10 is a diagram illustrating an example of a change in a use state of frequency bands according to the same embodiment.

FIG. 10 is a diagram illustrating an example of a change in a use state of frequency bands. In an example indicated by a reference symbol ST1, which is a case where carrier aggregation is not performed, the mobile station device 105 and HeNB 101 communicate with each other using a frequency band F1. HeNB 102 can use a frequency band F2, but is not communicating with the mobile station device 105. This corresponds to Sa1 shown in FIG. 9. On the other hand, in an example indicated by a reference symbol ST2, which is a case where carrier aggregation is performed, the mobile station device 105 and HeNB 101 communicate with each other using the frequency band F1, and the mobile station device 105 and HeNB 102 communicate with each other using the frequency band F2. This corresponds to Sa15 shown in FIG. 9.

Thus, even when only one component carrier is provided by HeNB 101, the mobile station device 105 becomes able to simultaneously communicate with HeNB 101 and another base station device (HeNB 102 in this case), thus making it possible to obtain an excellent transmission speed.

[Second Embodiment]

Hereinafter, a second embodiment of the present invention will be described with reference to drawings. Similar to the wireless communication system 100 shown in FIG. 1, a wireless communication system 100a according to the present embodiment is configured to include HeNB 101a, HeNB 102a, HeNB 103a, HeNB GW 104, and a mobile station device 105a. HeNB GW 104 is similar to HeNB GW 104 shown in FIG. 1, and therefore description thereof is omitted here. HeNB 101a, HeNB 102a, and HeNB 103a have similar configurations to that of HeNB 101 shown in FIG. 1, but have functional configurations that differ in part from that of HeNB 101, and therefore will be described later. Additionally, the mobile station device 105a has a similar configuration to that of the mobile station device 105 shown in FIG. 1, but has a functional configuration that differs in part from that of the mobile station device 105, and therefore will be described later.

Figure 11:
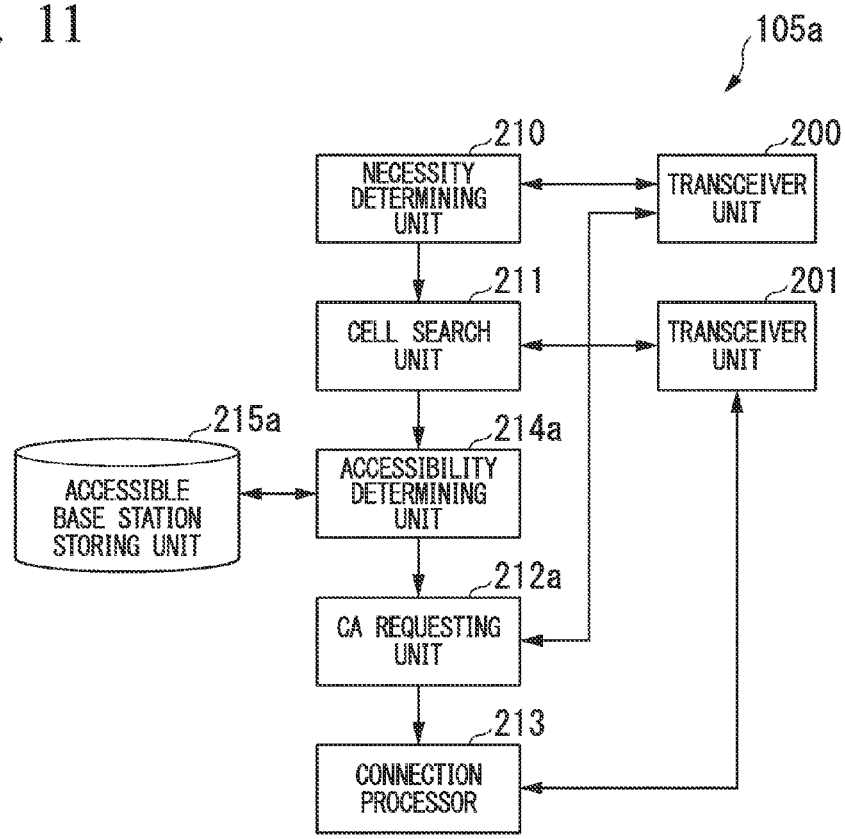
FIG. 11 is a schematic block diagram showing a part of a logical functional configuration of a mobile station device 105a according to a second embodiment of the present invention.

FIG. 11 is a schematic block diagram showing a part of a logical functional configuration of the mobile station device 105a. In the same figure, the necessity determining unit 210, the cell search unit 211, a CA requesting unit 212a, the connection processor 213, a accessibility determining unit 214a, and an accessible base station device storing unit 215a are realized by the controller 203 reading and executing the program stored by the memory unit 204. Additionally, in the same figure, the same reference numerals (200, 201, 210, 211, and 213) are appended to portions corresponding to those shown in FIG. 3, and description thereof is omitted here. Here, in the following, communication with HeNB 101a is performed via the transceiver unit 200, and communication with HeNB 102a is performed via the transceiver unit 201.

The accessible base station storing unit 215a stores a list (also called CSG_whitelist) of identification information (also called a cell ID or a CSG ID) of accessible HeNB which is included in HeNBs of the base station type CSG_HeNB, and to which the mobile station device 105 is registered. Here, the accessible base station storing unit 215a may also store a list of identification information of HeNB which is included in HeNBs of the base station type Hybrid_HeNB, to which the mobile station device 105 is registered, and which preferentially allocates a band to the mobile station device 105.

If the base station type of the base station device detected by the search unit 211 is CSG_HeNB, the accessibility determining unit 214a checks the identification information thereof against the identification informations of base station devices stored by the accessible base station storing unit 215a. If if there is matching identification information as a result of this check, the accessibility determining unit 214a determines that the base station device is accessible.

If the base station the type of the base station device detected by the cell search unit 211 is CSG_HeNB, and the accessibility determining unit 214a determines that the base station device is accessible, the CA requesting unit 212a transmits a request for CA communication to a base station device (HeNB101a in this case) in communication with the mobile station device 105a. Here, as the request for CA communication, it is allowable to use information obtained by adding to peripheral cell information (PI; Proximity Indication) used for handover to HeNB, a bit representing that this information is for carrier aggregation. Here, conventional peripheral cell information may be treated as PI_for_HO (Hand Over) that is a handover request, and peripheral cell information for requesting carrier aggregation communication may be newly provided as PI_for_CA. PI_for_CA is added with parameters for continued use of so far used communication, other than the conventional peripheral cell information.

As an example of a method of adding a parameter, there is a method of adding one-bit information to the conventional peripheral cell information for requesting handover. In this method, when the added one-bit information is "0", the peripheral cell information indicates the conventional peripheral cell information for requesting handover. When the added one-bit information is "1", the peripheral cell information indicates new peripheral cell information for requesting carrier aggregation.

Additionally, upon receiving a response to the request for CA communication, the CA requesting unit 212a transmits a request for carrier aggregation to HeNB 101 in a similar manner to the CA requesting unit 212 shown in FIG. 3.

Figure 12:
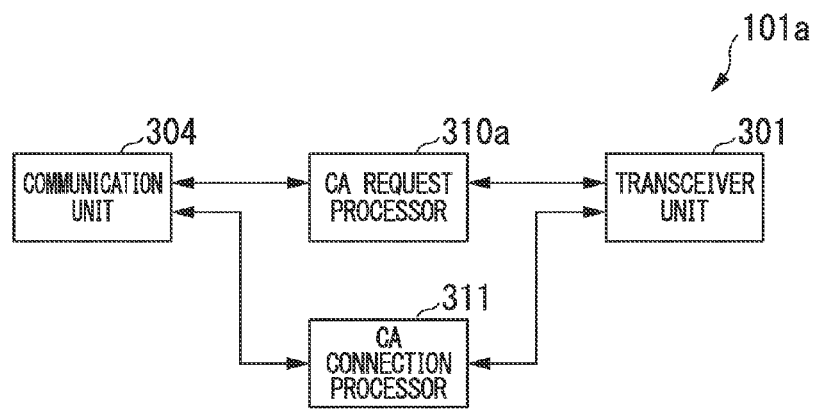
FIG. 12 is a schematic block diagram showing a part of a logical functional configuration of HeNB 101a according to the same embodiment.

FIG. 12 is a schematic block diagram showing a part of a logical functional configuration of HeNB 101a. HeNB 102a and HeNB 103a have similar logical functional configurations to that of HeNB 101a, and therefore description thereof is omitted here. In the same figure, the CA request processor 310a and the CA connection processor 311 are realized by the controller 302 reading and executing the program stored by the memory unit 303.

Additionally, the same reference numerals (311) are appended to portions corresponding to those shown in FIG. 5, and description thereof is omitted here. Upon receiving a request for CA communication from the mobile station device, the CA requesting processor 310a transmits to the mobile station device, a response to the request for CA communication. Additionally, upon receiving a CA request from the mobile station device to which the response is addressed, thereafter, the CA requesting processor 310a operates similarly to the CA requesting processor 310 shown in FIG. 5.

Figure 13:
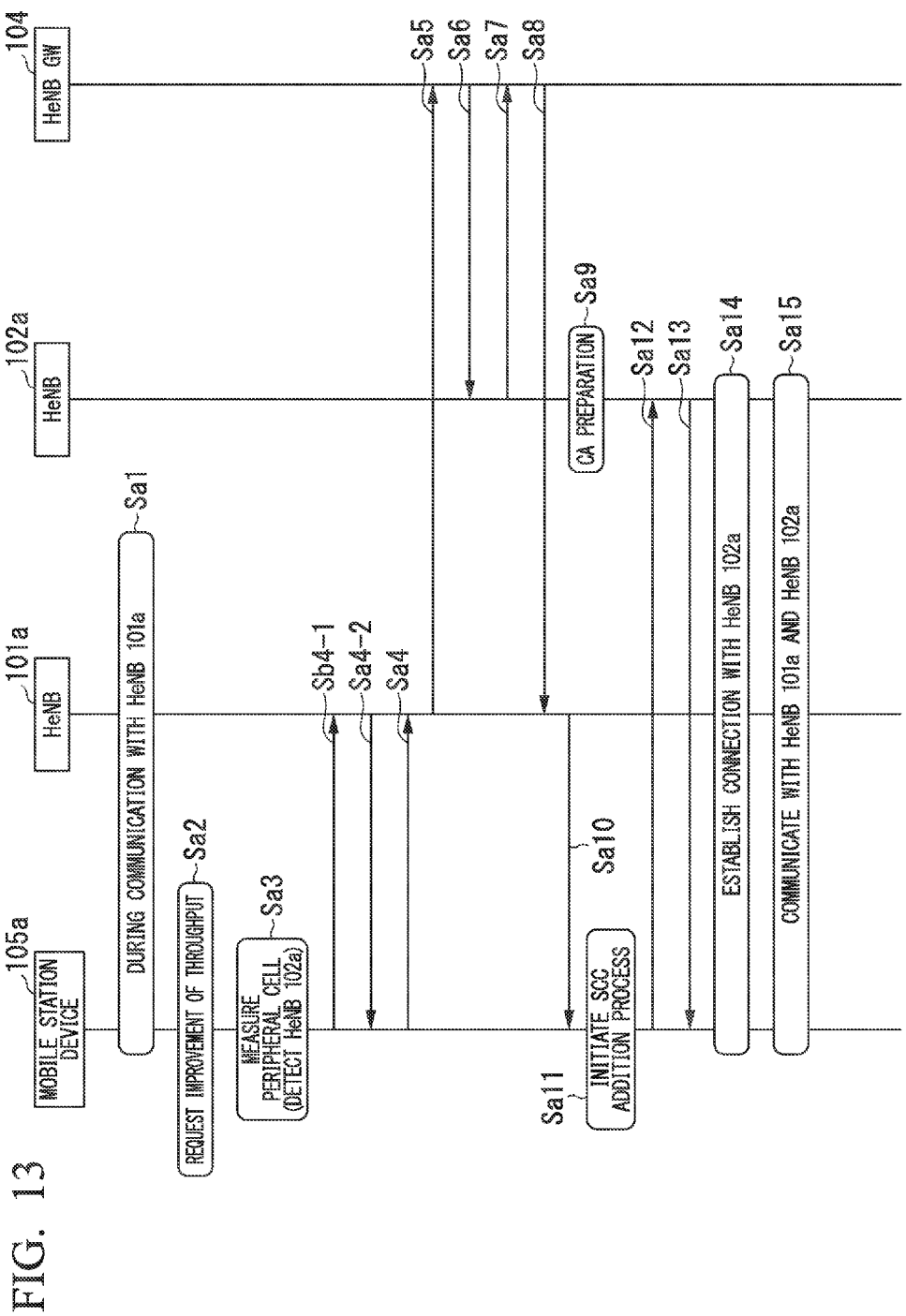
FIG. 13 is a sequence diagram illustrating operation of a wireless communication system 100a according to the same embodiment.

FIG. 13 is a sequence diagram illustrating operation of the wireless communication system 100a according to the present embodiment. In the same figure, the same reference symbols (Sa1 to Sa15) are appended to portions corresponding to those shown in FIG. 9, and description thereof is omitted here. The sequence shown in FIG. 13 differs from that shown in FIG. 9 in that sequences Sb4-1 and Sb4-2 are included between the sequences Sa3 and Sa4. In the sequence Sb4-1, if the accessibility determining unit 214a determines that HeNB 102a is accessible, the CA communication requesting unit 212a of the mobile station device 105a transmits a request for CA communication (PI_for_CA) to HeNB 101a (Sb4-1). Upon receiving this request for CA communication, the CA request processor 310a of HeNB 101a returns a response (PI_for_CA_ACK) to the mobile station device 105a (Sb4-2).

Thus, even when only one component carrier is provided by HeNB 101a, the mobile station device 105a becomes able to simultaneously communicate with HeNB 101a and another base station device (HeNB 102a in this case), thus making it possible to obtain an excellent transmission speed.

[Third Embodiment]

Hereinafter, a third embodiment of the present invention will be described with reference to drawings. Similar to the wireless communication system 100 shown in FIG. 1, a wireless communication system 100b according to the present embodiment is configured to include HeNB 101b, HeNB 102b, HeNB 103b, HeNB GW 104, and a mobile station device 105b. HeNB GW 104 is similar to HeNB GW 104 shown in FIG. 1, and therefore description thereof is omitted here. HeNB 101b, HeNB 102b, and HeNB 103b have similar configurations to that of HeNB 101 shown in FIG. 1, but have functional configurations that differ in part from that of HeNB 101, and therefore will be described later. Additionally, the mobile station device 105b has a similar configuration to that of the mobile station device 105 shown in FIG. 1, but has a functional configuration that differs in part from that of the mobile station device 105, and therefore will be described later.

Figure 14:
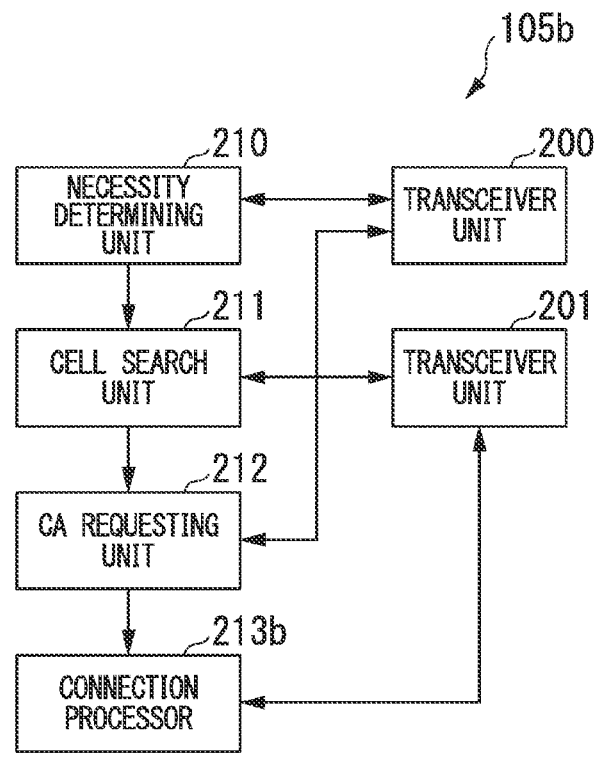
FIG. 14 is a schematic block diagram showing a part of a logical functional configuration of a mobile station device 105b according to a third embodiment of the present invention.

FIG. 14 is a schematic block diagram showing a part of a logical functional configuration of the mobile station device 105b. In the same figure, the necessity determining unit 210, the cell search unit 211, the CA requesting unit 212a, and a connection processor 213b are realized by the controller 203 reading and executing the program stored by the memory unit 204. Additionally, in the same figure, the same reference numerals (200, 201, and 210 to 212) are appended to portions corresponding to those shown in FIG. 3, and description thereof is omitted here. Here, in the following, communication with HeNB 101b is performed via the transceiver unit 200, and communication with HeNB 102b is performed via the transceiver unit 201.

The connection processor 213b performs a process of establishing connection with the base station device as SCC. When the CA requesting unit 212 receives a response to the request for carrier aggregation, the connection processor 213 performs a connection process with the base station device (HeNB 102b in this case) detected by the cell search unit 211. Specifically, the connection processor 213b sets to the transceiver unit 201, a frequency used to communicate with HeNB 102b. Then, the connection processor 213b enters a state of waiting for a request for carrier aggregation connection from HeNB 102b. Upon receiving a request for carrier aggregation connection, the connection processor 213b returns a response (ACK) to HeNB 102b, and thus becomes connected to HeNB 102b (Sa14).

Figure 15:
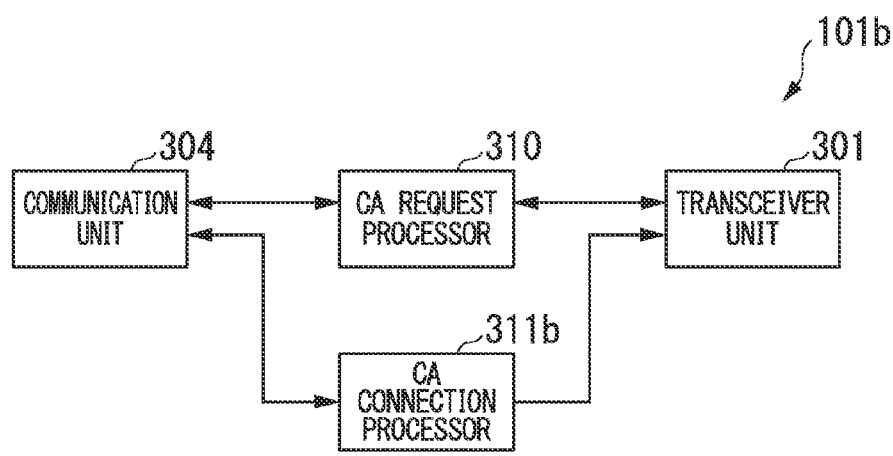
FIG. 15 is a schematic block diagram showing a part of a logical functional configuration of HeNB 101b according to the same embodiment.

FIG. 15 is a schematic block diagram showing a part of a logical functional configuration of HeNB 101b. HeNB 102a and HeNB 103a have similar logical functional configurations to that of HeNB 101b, and therefore description thereof is omitted here. In the same figure, the CA request processor 310 and the CA connection processor 311b are realized by the controller 302 reading and executing the program stored by the memory unit 303.

Additionally, in the same figure, the same reference numerals (310) are appended to portions corresponding to those shown in FIG. 5, and description thereof is omitted here. Upon receiving a request for CA communication from HeNB GW 104, the CA connection processor 311b returns a response (ACK). Then, the CA connection processor 311b performs a process of establishing connection as SCC with the mobile station device indicated by the information included in the request. This connection process differs from that performed by the CA connection processor 311 shown in FIG. 5. When preparation to communicate with the mobile station device indicated by the information included in the request is completed, the CA connection processor 311b transmits a request for CA connection to the mobile station device. Then, the CA connection processor 311b receives a response to the request for CA connection, and thereby becomes connected to the mobile station device.

Figure 16:
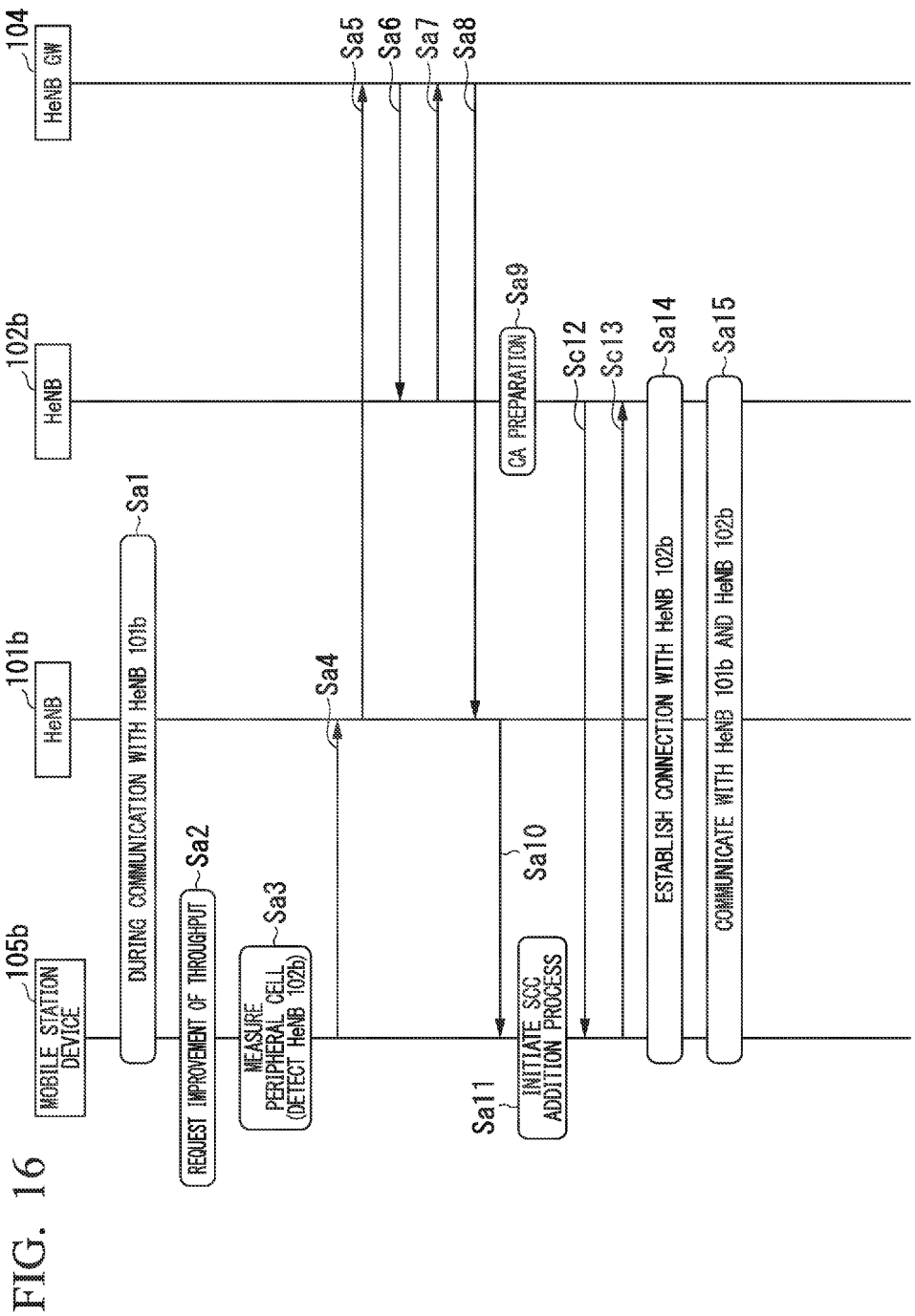
FIG. 16 is a sequence diagram illustrating operation of a wireless communication system 100b according to the same embodiment.

FIG. 16 is a sequence diagram illustrating operation of the wireless communication system 100b according to the present embodiment. In the same figure, the same reference symbols (Sa1 to Sa11, Sa14, and Sa15) are appended to portions corresponding to those shown in FIG. 9, and description thereof is omitted here. The sequence shown in FIG. 16 differs from that shown in FIG. 9 in that sequences Sc12 and Sc13 are included in lieu of the sequences Sa12 and Sa13. In sequence Sc12, the CA connection processor 311b of HeNB 102b transmits a request for carrier aggregation connection (CA connection request) to the mobile station device 105b (Sc12). The connection processor 213b of the mobile station device 105b having received the request for carrier aggregation connection transmits to HeNB 102c, a response (ACK) to that connection request (Sc13). Thus, the mobile station device 105c and HeNB 102c become connected to each other (Sa14).

Thus, even when only one component carrier is provided by HeNB 101b, the mobile station device 105b becomes able to simultaneously communicate with HeNB 101b and another base station device (HeNB 102b in this case), thus making it possible to obtain an excellent transmission speed.

[Fourth Embodiment]

Hereinafter, a fourth embodiment of the present invention will be described with reference to drawings. Similar to the wireless communication system 100 shown in FIG. 1, a wireless communication system 100c according to the present embodiment is configured to include HeNB 101c, HeNB 102c, HeNB 103c, HeNB GW 104c, and a mobile station device 105c. HeNB 101c, HeNB 102c, and HeNB 103c have similar configurations to that of HeNB 101 shown in FIG. 1, but have functional configurations that differ in part from that of HeNB 101, and therefore will be described later. Additionally, HeNB GW 104c has a similar configuration to that of HeNB GW 104 shown in FIG. 1, but has a logical functional configuration that differs in part from that of HeNB GW 104 shown in FIG. 1, and therefore will be described later. The mobile station device 105c has a similar configuration to that of the mobile station device 105 shown in FIG. 1, but has a logical functional configuration that differs in part from that of the mobile station device 105, and therefore will be described later.

Figure 17:
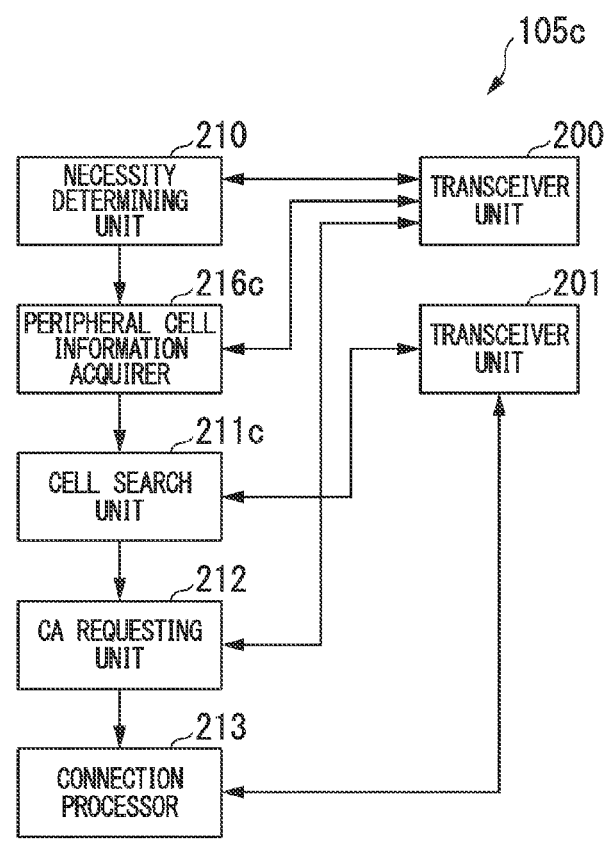
FIG. 17 is a schematic block diagram showing a part of a logical functional configuration of a mobile station device 105c according to a fourth embodiment of the present invention.

FIG. 17 is a schematic block diagram showing a part of a logical functional configuration of the mobile station device 105c. In the same figure, the necessity determining unit 210, a cell search unit 211c, the CA requesting unit 212, the connection processor 213, and a peripheral cell information acquirer 216c are realized by the controller 203 reading and executing the program stored by the memory unit 204. Additionally, in the same figure, the same reference numerals (200, 201, 210, 212, and 213) are appended to portions corresponding to those shown in FIG. 3, and description thereof is omitted here. Here, in the following, communication with HeNB 101c is performed via the transceiver unit 200, and communication with HeNB 102c is performed via the transceiver unit 201.

When the necessity determining unit 210 determines that carrier aggregation is necessary, the peripheral cell information acquirer 216c requests peripheral cell information for carrier aggregation from the base station device (HeNB 101c in this case) in communication with the mobile station device. Upon receiving the peripheral cell information transmitted by HeNB 101c as a response to that request, the peripheral cell information acquirer 216c inputs the received peripheral cell information to the cell search unit 211c. Here, the peripheral cell information for carrier aggregation includes information regarding a base station device serving a cell peripheral to the cell served by HeNB 101c and being able to perform carrier aggregation with HeNB 101c (such as a cell ID and a frequency).

The cell search unit 211c searches a communication available base station device from among base station devices included in the peripheral cell information acquired by the peripheral cell information acquirer 216c. Here, the peripheral cell information for carrier aggregation acquired by the peripheral cell information acquirer 216c may include only information specifying a base station device, such as a cell ID. In this case, as to other information required to search a base station device (such as a frequency), information transmitted by HeNB 101c and included in broadcast information is used.

Figure 18:
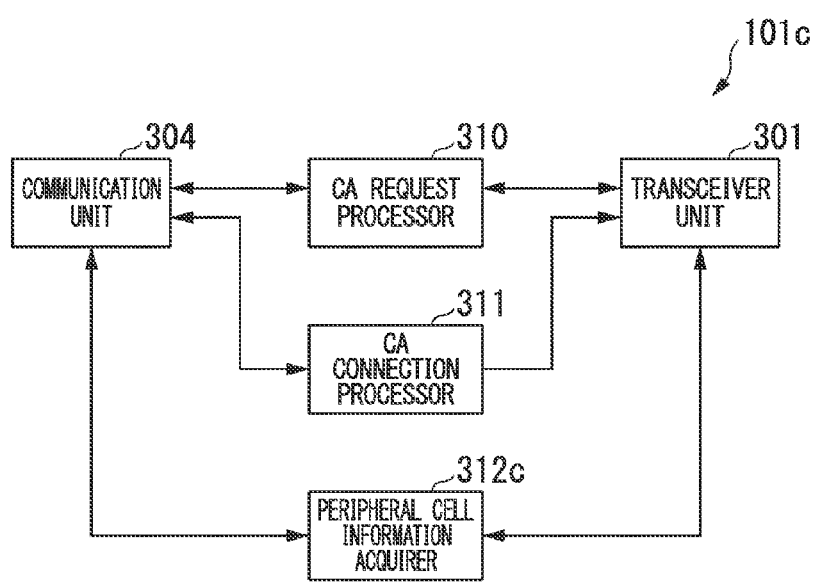
FIG. 18 is a schematic block diagram showing a part of a logical functional configuration of HeNB 101c according to the same embodiment.

FIG. 18 is a schematic block diagram showing a part of a logical functional configuration of HeNB 101c. HeNB 102c and HeNB 103c have similar configurations to that of HeNB 101c, and therefore description thereof is omitted here. In the same figure, the CA request processor 310, the CA connection processor 311, and a peripheral cell information acquirer 312c are realized by the controller 302 reading and executing the program stored by the memory unit 303. Additionally, in the same figure, the same reference numerals (310, 311) are appended to portions corresponding to those shown in FIG. 5, and description thereof is omitted here. Upon receiving from the mobile station device, a request for peripheral cell information for carrier aggregation, the peripheral cell information acquirer 312c transmits the request to HeNB GW 104c. Then, the peripheral cell information acquirer 312c transmits to the mobile station device having transmitted the request, the peripheral information received from HeNB GW 104, as a response to the request.

Figure 19:
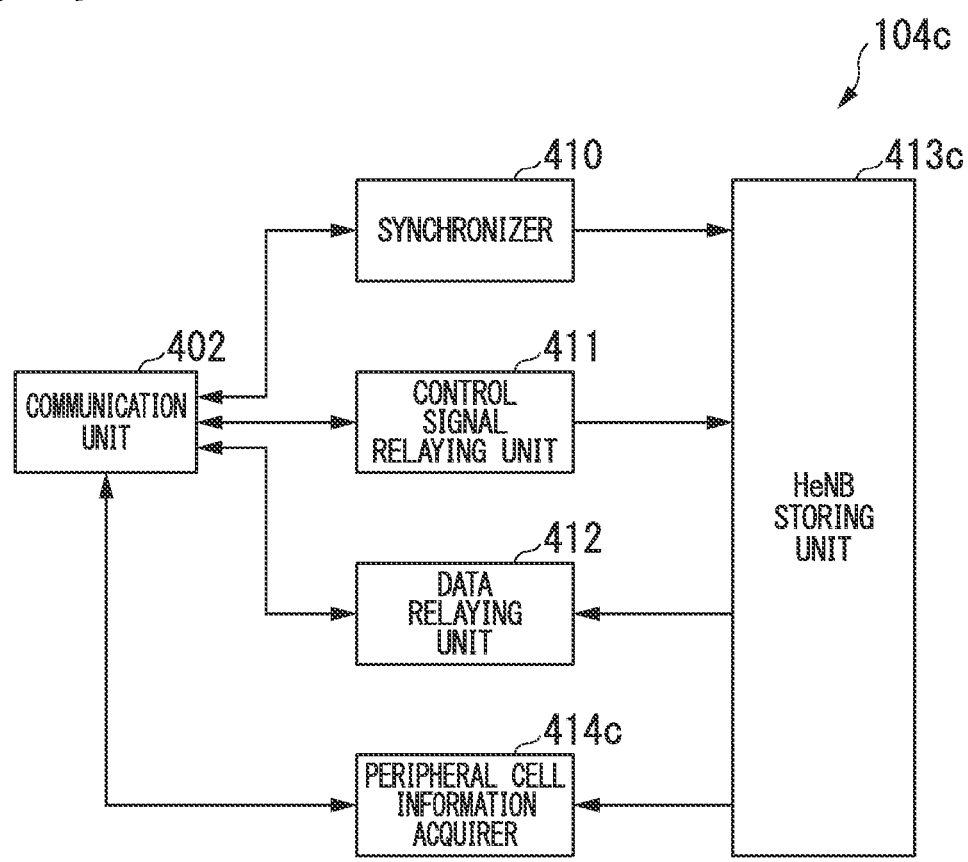
FIG. 19 is a schematic block diagram showing a part of a logical functional configuration of HeNB GW 104c according to the same embodiment.

FIG. 19 is a schematic block diagram illustrating a part of a logical functional configuration of HeNB GW 104c. In the same figure, the synchronizer 410, the control signal relaying unit 411, the data relaying unit 412, an HeNB storing unit 413c, and a peripheral cell information acquirer 414c are realized by the controller 400 reading and executing the program stored by the memory unit 401. Additionally, in the figure, the same reference numerals (410 to 412) are appended to portions corresponding to those shown in FIG. 7, and description thereof will be omitted here.

Similar to HeNB GW 104, the HeNB storing unit 413c stores identification information of HeNB under control of the HeNB GW 104c, and identification information of the mobile station device connected to that HeNB, while associating those identification informations with each other. Further, for each of HeNBs under the control of the HeNB GW 104c, the HeNB storing unit 413c also stores information indicating whether or not that HeNB has a function of performing carrier aggregation, and information indicating which HeNB serves a peripheral cell. Upon receiving from a base station device (HeNB 101c in this case), a request for peripheral cell information for carrier aggregation, the peripheral cell information acquirer 414c reads from the HeNB storing unit 413c, identification informations of HeNBs which serve cells peripheral to the cell served by the base station device having transmitted the request, and which have a function of performing carrier aggregation. The peripheral cell information acquirer 414c transmits to the base station device having transmitted the request (HeNB 101c in this case), the read list of identification informations, as a response to the request for peripheral cell information for carrier aggregation.

Figure 20:
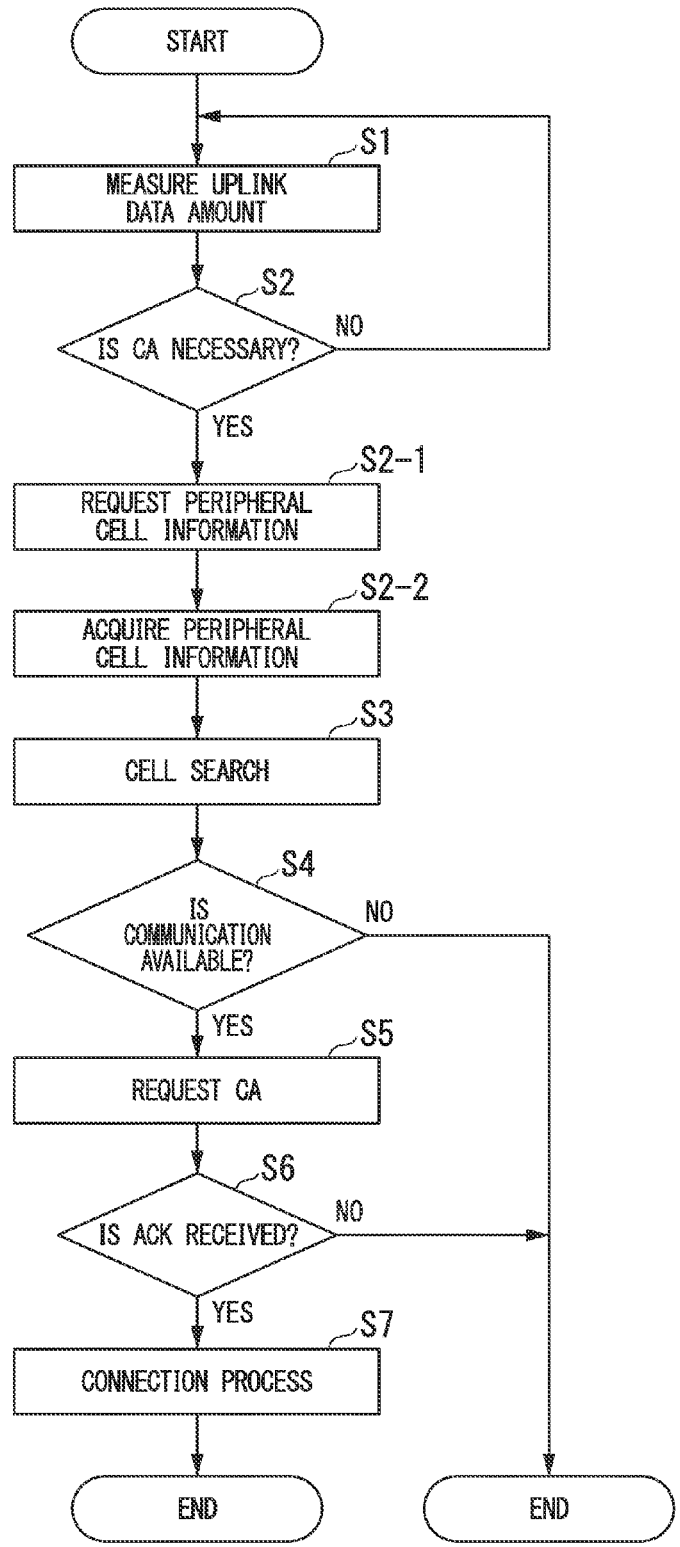
FIG. 20 is a flowchart illustrating operation of a mobile station device 105c according to the same embodiment.

FIG. 20 is a flowchart illustrating operation of the mobile station device 105c according to the present embodiment. The mobile station device 105c periodically performs the processing indicated by the flowchart shown in FIG. 20. The flowchart shown in FIG. 20 differs from the flowchart shown in FIG. 8 only in that steps S2-1 and S2-1 are included between steps S2 and S3. The other steps S1 to S7 are the same as those shown in FIG. 8, and therefore description thereof is omitted here. If it is determined in step S2 that carrier aggregation is necessary, the peripheral cell information acquirer 216c requests peripheral cell information for carrier aggregation from the base station device (HeNB 101c in this case) in communication with the mobile station device 105c (S2-1). As a response to the request, the peripheral cell information acquirer 216c receives the peripheral cell information from HeNB 101c. Thus, the peripheral cell information acquirer 216c acquires the peripheral cell information from HeNB 101c (S2-2). The peripheral cell information acquirer 216c inputs the acquired peripheral cell information to the cell search unit 211c.

Figure 21:
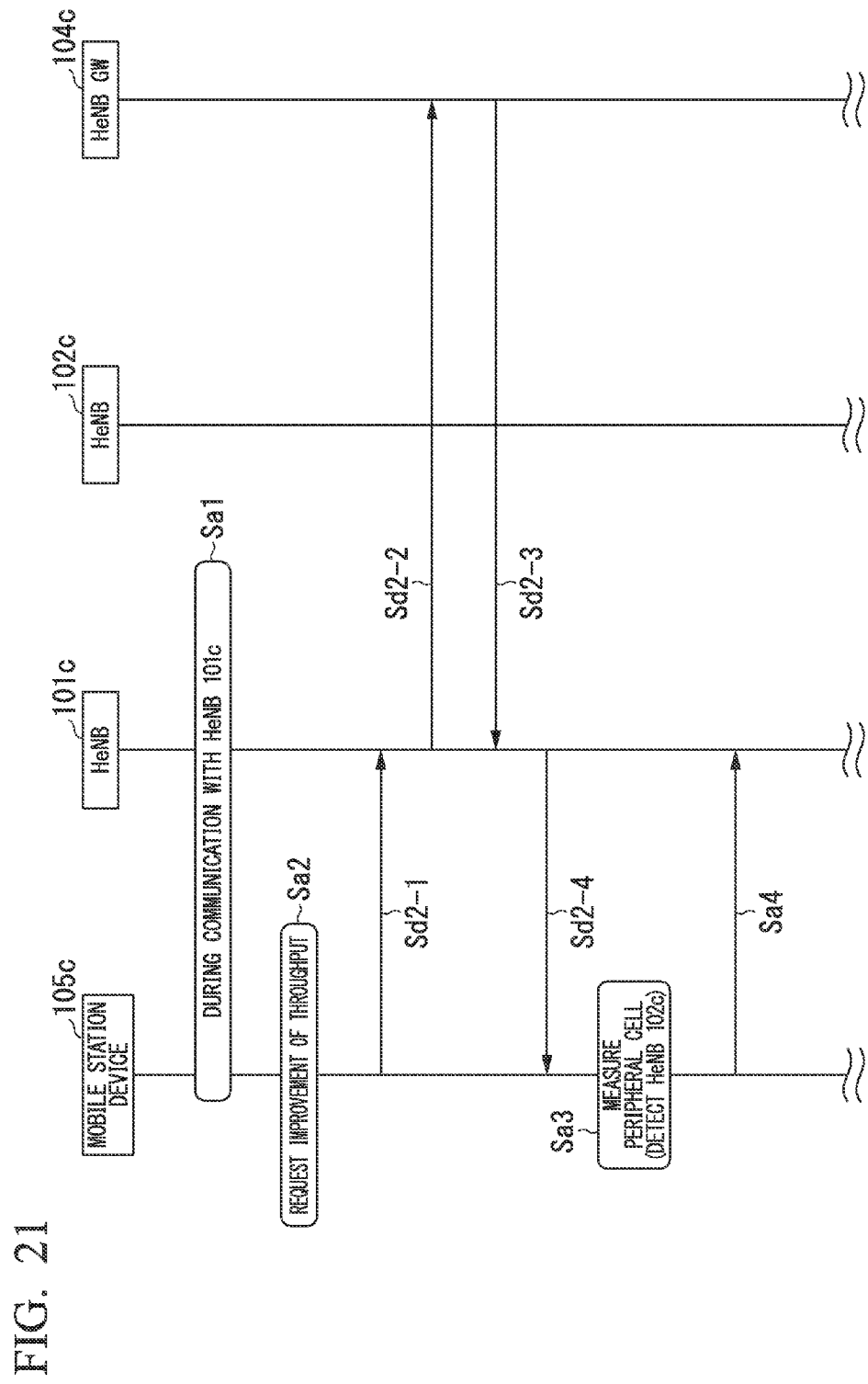
FIG. 21 is a sequence diagram illustrating operation of a wireless communication system 100c according to the same embodiment.

FIG. 21 is a sequence diagram illustrating operation of the wireless communication system 100c according to the present embodiment. In the same figure, the same reference symbols (Sa1 to Sa4) are appended to portions corresponding to those shown in FIG. 9, and description thereof is omitted here. The sequence shown in FIG. 21 differs from that shown in FIG. 9 in that sequences Sd2-1 and Sd2-4 are inserted between the sequences Sa2 and Sa3. In the sequence Sd2-1, the peripheral cell information acquirer 216c of the mobile station device 105c requests peripheral cell information for carrier aggregation from HeNB 101c in communication with the mobile station device. Next, in the sequence Sd2-2, upon receiving from the mobile station device, the request in the sequence Sd2-1, the peripheral cell information acquirer 312c of HeNB 101c transmits that request to HeNB GW 104c. Next, in the sequence Sd2-3, upon receiving the request in the sequence Sd2-2, the peripheral cell information acquirer 414c of HeNB GW 104c reads from the HeNB storing unit 413c, identification informations of HeNBs which serve cells peripheral to the cell served by HeNB 101c having transmitted the request, and which have a function of performing carrier aggregation. As a response to the request in the sequence Sd2-2, the peripheral cell information acquirer 414c transmits the read list of identification informations to HeNB 101c having transmitted the request. Next, in the sequence S2-4, upon receiving the response in the sequence Sd2-3, the peripheral cell information acquirer 312c of HeNB 101c transmits to the mobile station device having transmitted the request, the received response as a response to the request in sequence Sd2-1.

Thus, even when only one component carrier is provided by HeNB 101c, the mobile station device 105c becomes able to simultaneously communicate with HeNB 101c and another base station device (HeNB 102c in this case), thus making it possible to obtain an excellent transmission speed.

Further, the measurement of peripheral cells is performed by the mobile station device 105c referring to the information indicating a cell having the function of performing carrier aggregation, which is acquired from HeNB GW 104c via HeNB 101c. Thus, it is possible to reduce the processing amount at the time of the measurement of peripheral cells.

[Fifth Embodiment]

Figure 22:
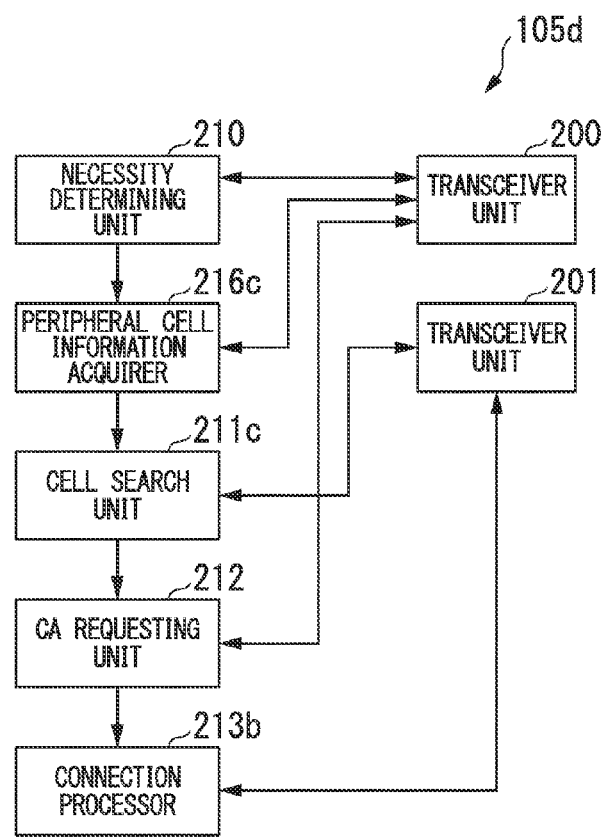
FIG. 22 is a schematic block diagram showing a part of a logical functional configuration of a mobile station device 105d according to a fifth embodiment of the present invention.

Hereinafter, a fifth embodiment of the present invention will be described with reference to drawings. Similar to the wireless communication system 100 shown in FIG. 1, a wireless communication system 100d according to the present embodiment is configured to include HeNB 101d, HeNB 102d, HeNB 103d, HeNB GW 104c, and a mobile station device 105d. HeNB 101d, HeNB 102d, and HeNB 103d have similar configurations to that of HeNB 101 shown in FIG. 1, but have logical functional configurations that differ in part from that of HeNB 101, and therefore will be described later. Additionally, HeNB GW 104c has a similar configuration to that of HeNB GW 104c shown in FIG. 19. The mobile station device 105d has a similar configuration to that of the mobile station device 105 shown in FIG. 1, but has a logical functional configuration that differs in part from that of the mobile station device 105, and therefore will be described later.

f su 22 is a schematic block diagram showing a part of a logical functional configuration of the mobile station device 105d. In the same figure, the necessity determining unit 210, the cell search unit 211c, the CA requesting unit 212, the connection processor 213b, and a peripheral cell information acquirer 216c are realized by the controller 203 reading and executing the program stored by the memory unit 204. Additionally, in the same figure, the same reference numerals (200, 201, 210, 211c, 212, 213, and 213b) are appended to portions corresponding to those shown in FIGS. 3, 14, and 17, and description thereof is omitted here. As shown in FIG. 22, the mobile station device 105d is obtained by adding to the mobile station device 105 shown in FIG. 3, similar modification made to the mobile station device 105b shown in FIG. 14 and similar modification made to the mobile station device 105c shown in FIG. 17.

Figure 23:
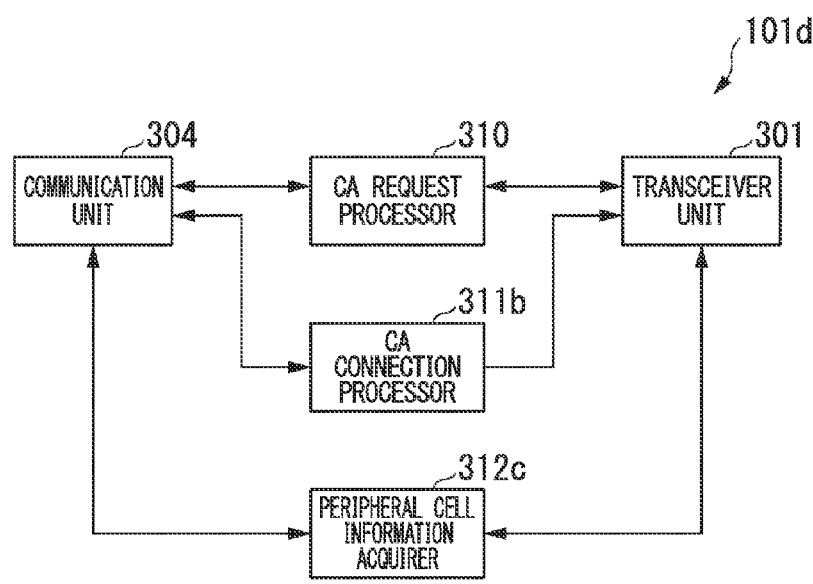
FIG. 23 is a schematic block diagram showing a part of a logical functional configuration of HeNB 101d according to the same embodiment.

FIG. 23 is a schematic block diagram showing a part of a logical functional configuration of HeNB 101d. HeNB 102d and HeNB 103d have similar configurations to that of HeNB 101d, and therefore description thereof is omitted here. In the same figure, the CA request processor 310, the CA connection processor 311b, and a peripheral cell information acquirer 312c are realized by the controller 302 reading and executing the program stored by the memory unit 303. Additionally, in the same figure, the same reference numerals (301, 304, 310, 311b, and 312c) are appended to portions corresponding to those shown in FIGS. 5, 15, and 18, and description thereof is omitted here. As shown in FIG. 23, the HeNB 101d is obtained by adding to HeNB 101 shown in FIG. 5, similar modification made to HeNB 101b shown in FIG. 15 and similar modification made to HeNB 101c shown in FIG. 18.

Thus, the present embodiment is obtained by applying the fourth embodiment to the third embodiment. Therefore, it is possible to obtain an excellent transmission speed, similarly to the third embodiment and the fourth embodiment. Further, it is possible to reduce the processing amount at the time of the measurement of peripheral cells.

[Sixth Embodiment]

Hereinafter, a sixth embodiment of the present invention will be described with reference to drawings. Similar to the wireless communication system 100 shown in FIG. 1, a wireless communication system 100e according to the present embodiment is configured to include HeNB 101, HeNB 102, HeNB 103, HeNB GW 104, and a mobile station device 105e. HeNB 101, HeNB 102, HeNB 103, and HeNB GW 104 have similar configurations to those of HeNB 101, HeNB 102, HeNB 103, and HeNB GW 104 shown in FIG. 1, and therefore description thereof is omitted here. Additionally, the mobile station device 105e has a configuration that differs in part from that of the mobile station device 105 shown in FIG. 1, and therefore will be described later.

Figure 24:
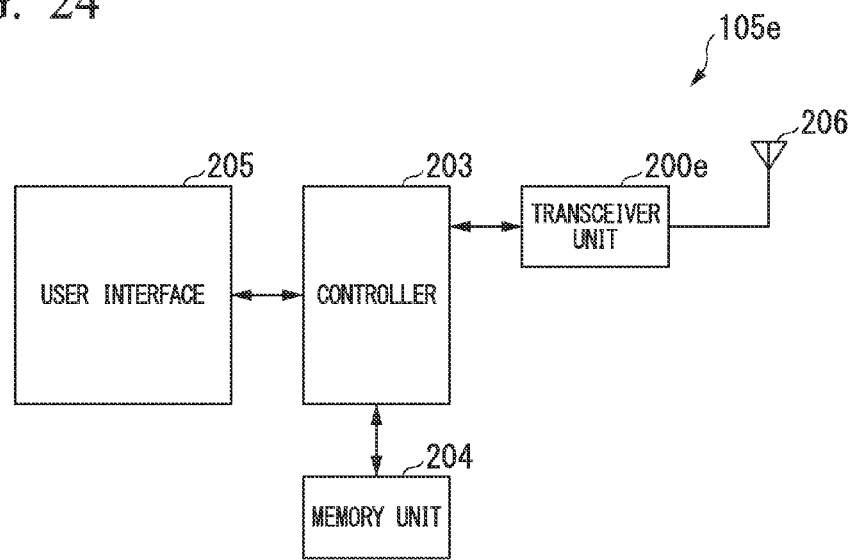
FIG. 24 is a schematic block diagram showing a configuration of a mobile station device 105e according to a sixth embodiment of the present invention.

FIG. 24 is a schematic block diagram showing a configuration of a mobile station device 105e. The mobile station device 105e is configured to include a transceiver unit 200e, the controller 203, the memory unit 204, the user interface 205, and two transceiver units 206 and 207. Additionally, in the same figure, the same reference numerals (203 to 206) are appended to portions corresponding to those shown in FIG. 2, and description thereof is omitted here. The transceiver unit 200e differs from the transceiver unit 200 shown in FIG. 2 in that it is possible to perform communication simultaneously using a plurality of component carriers in the same frequency band.

Figure 25:
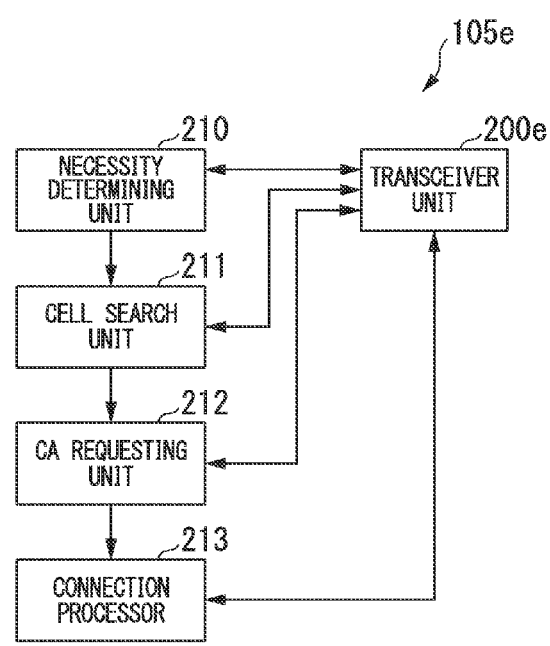
FIG. 25 is a schematic block diagram showing a part of a logical functional configuration of a mobile station device 105e according to the same embodiment.

FIG. 25 is a schematic block diagram showing a part of a logical functional configuration of the mobile station device 105e. In the same figure, the necessity determining unit 210, the cell search unit 211, the CA requesting unit 212, and the connection processor 213 are realized by the controller 203 reading and executing the program stored by the memory unit 204. Additionally, in the same figure, the same reference numerals (210 to 213) are appended to portions corresponding to those shown in FIG. 3, and description thereof is omitted here. As shown in FIG. 25, the present embodiment differs from the first embodiment in that not only the necessity determining unit 210 and the CA requesting unit 212, but also the cell search unit 211 and the connection processor 213 perform communication via the transceiver unit 200e.

Figure 26:
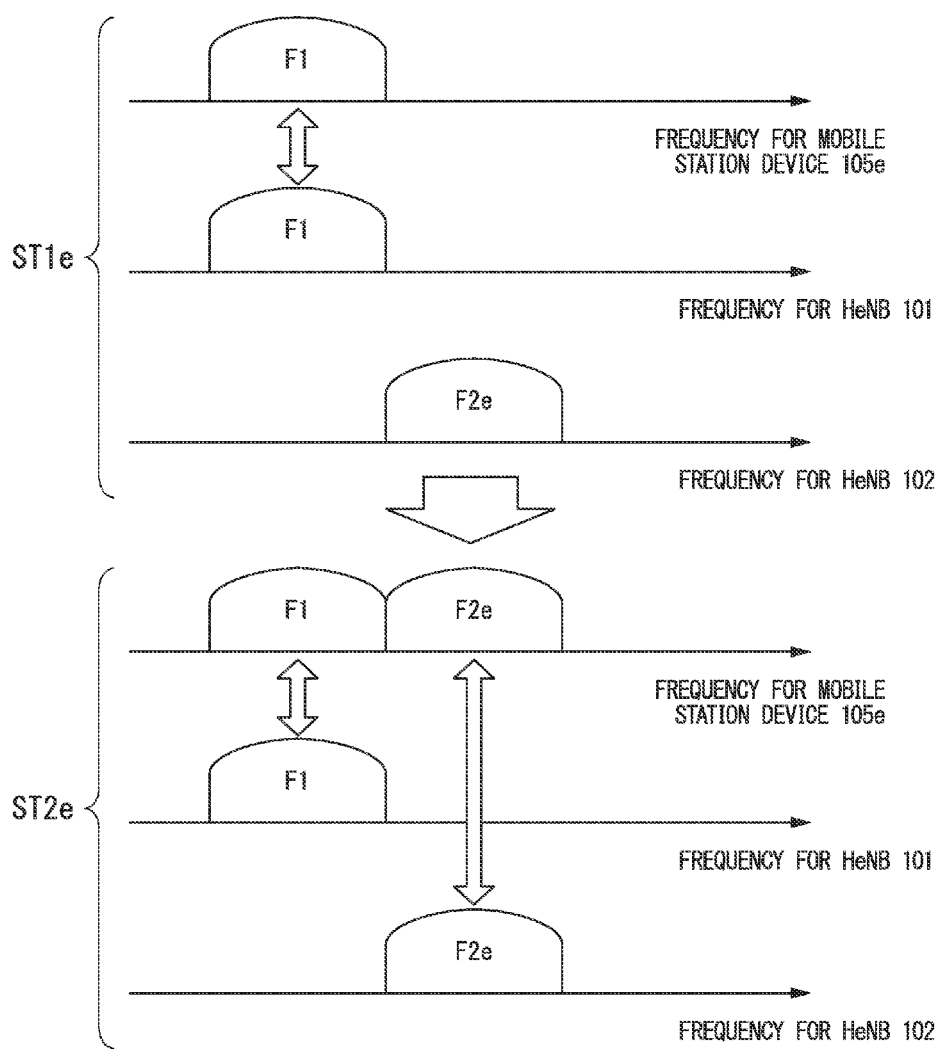
FIG. 26 is a diagram illustrating an example of a change in a use state of frequency bands according to the same embodiment.

FIG. 26 is a diagram illustrating an example of a change in a use state of frequency bands. In an example indicated by a reference symbol ST1e which is a case where carrier aggregation is not performed, the mobile station device 105e and HeNB 101 communicate with each other using a frequency band F1. HeNB 102 can use a frequency band F2, but is not communicating with the mobile station device 105e. On the other hand, in an example indicated by a reference symbol ST2e which is a case where carrier aggregation is performed, the mobile station device 105e and HeNB 101 communicate with each other using the frequency band F1, and the mobile station device 105e and HeNB 102 communicate with each other using a frequency band F2e adjacent to the frequency band F1.

Here, in the present embodiment, the frequency band F1 and the frequency band F2e are adjacent to each other. However, these frequency bands need not always be adjacent to each other as long as these frequency bands are included in a frequency band available to the transceiver unit 200e.

Thus, even when only one component carrier is provided by HeNB 101, and the number of transceiver units included in the mobile station device 105e is only one, the mobile station device 105e becomes able to simultaneously communicate with HeNB 101 and another base station device (HeNB 102 in this case), thus making it possible to obtain an excellent transmission speed.

[Seventh Embodiment]

Hereinafter, a seventh embodiment of the present invention will be described with reference to drawings. Similar to the wireless communication system 100 shown in FIG. 1, a wireless communication system 100f according to the present embodiment is configured to include HeNB 101, HeNB 102, HeNB 103, HeNB GW 104, and a mobile station device 105f. HeNB 101, HeNB 102, HeNB 103, and HeNB GW 104 are similar to HeNB 101, HeNB 102, HeNB 103, and HeNB GW 104 shown in FIG. 1, and therefore description thereof is omitted here. Additionally, the mobile station device 105f has a configuration that differs in part from that of the mobile station device 105 shown in FIG. 1, and therefore will be described later.

Figure 27:
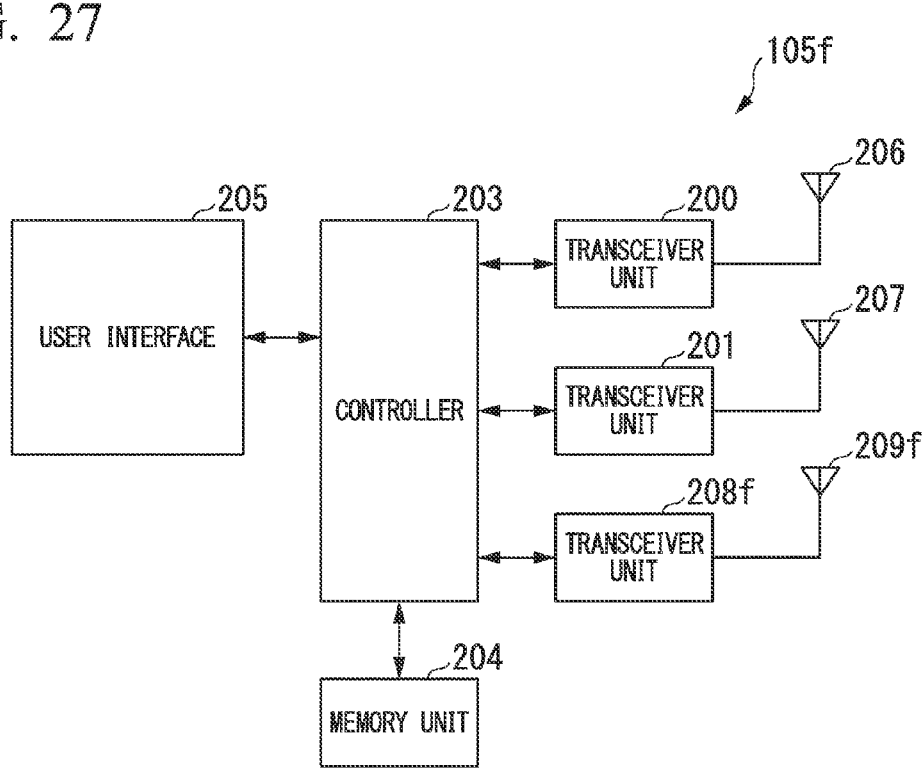
FIG. 27 is a schematic block diagram showing a configuration of a mobile station device 105f according to a seventh embodiment of the present invention.

FIG. 27 is a schematic block diagram showing a configuration of the mobile station device 105f. The mobile station device 105f is configured to include transceiver units 200, 201, and 208f, the controller 203, the memory unit 204, the user interface 205, and three transceiver antennas 206, 207, and 209f. Thus, the mobile station device 105f differs from the mobile station device 105 in FIG. 2 in that three sets of transceiver units and transceiver antennas are included.

Figure 28:
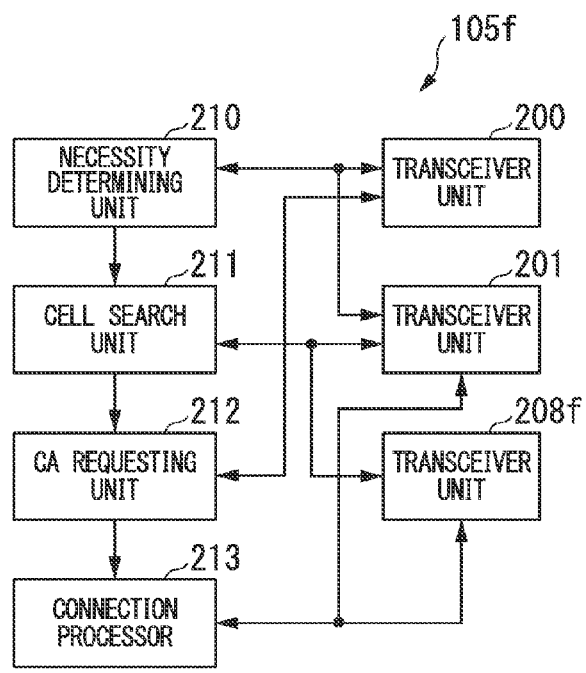
FIG. 28 is a schematic block diagram showing a configuration of a mobile station device 105f according to the same embodiment.

FIG. 28 is a schematic block diagram showing a part of a logical functional configuration of the mobile station device 105f. In the same figure, the necessity determining unit 210, the cell search unit 211, the CA requesting unit 212, and the connection processor 213 are realized by the controller 203 reading and executing the program stored by the memory unit 204. Additionally, in the same figure, the same reference numerals (210 to 213) are appended to portions corresponding to those shown in FIG. 3, and description thereof is omitted here. As shown in FIG. 28, the present embodiment differs in that the necessity determining unit 210 is connected to the transceiver units 200 and 201, and refers to communication states thereof. Additionally, the present embodiment differs in that the cell search unit 211 is connected to the transceiver units 201 and 208f, and is configured to perform measurement of peripheral cells using any one of those transceiver units. Further, the present embodiment differs in that the connection processor 213 is connected to the transceiver units 201 and 208f, and is configured to perform a connection process via any one of those transceiver units.

FIG. 29 is a sequence diagram illustrating operation of the wireless communication system 100f. In this figure, the same reference symbols (Sa2, Sa3, Sa8, Sa10, and Sa11) are appended to portions corresponding to those shown in FIG. 9, and therefor description thereof is omitted here. Additionally, the sequence shown in FIG. 29 differs in that Sf1, Sf4 to Sf7, Sf9, and Sf12 to Sf15 are included in lieu of Sa1, Sa4 to Sa1, Sa9, and Sa12 to Sa15 shown in FIG. 9. In the sequence Sf1 at the start of the sequence, the mobile station 105f is in communication with HeNB 101 and HeNB 102 by carrier aggregation. In the sequence Sf4, the CA requesting unit 212 of the mobile station device 105f transmits to HeNB 101, a request for carrier aggregation (CA request) including information identifying HeNB 103.

In the sequence Sf5, upon receiving the request for carrier aggregation, the CA request processor 310 of HeNB 101 transmits to HeNB GW 104, a request for carrier aggregation (CA request) with respect to HeNB 103 indicated by information included in the received request. In the sequence Sf6, upon receiving a request for carrier aggregation, the control signal relaying unit 411 of HeNB GW 104 forwards the received request to HeNB 103. In the sequence Sf7, upon receiving the request for carrier aggregation, the CA connection processor 311 of HeNB 103 returns a response (ACK) to HeNB GW 102. Additionally, in the sequence Sf9, the CA connection processor 311 of HeNB 103 prepares to establish connection with the mobile station device 105f identified by the information included in the received request, thus entering a state of waiting for a connection request from the mobile station device 105f.

In the sequence Sf12, in order to add HeNB 103 as SCC, the connection processor 213 of the mobile station device 105f transmits to HeNB 103, a request for carrier aggregation connection (CA connection request). At this time, the connection processor 213 transmits the request for carrier aggregation connection via the transceiver unit 208f. In the sequence Sf13, upon receiving the request for carrier aggregation connection, the CA connection processor 311 of HeNB 103, which has been in the state of waiting for a connection request from the mobile station device 105f, returns a response (ACK) to the mobile station 105f. Thereby, the mobile station device 105f becomes connected to HeNB 103 (Sf14), and communicates with HeNB 101, HeNB 102, and HeNB 103 (Sf15). Here, at this time, HeNB 101 as PCC, HeNB 102 as SCC, and HeNB 103 as SCC are connected to the mobile station device 105f.

FIG. 30 is a sequence diagram illustrating another operation of the wireless communication system 100f. In FIG. 29, the description has been given with respect to the case where the mobile station device 105f further adds HeNB 103 as a communication partner, while communicating with HeNB 101 and HeNB 102. In FIG. 30, description will be given with respect to a case where the mobile station device 105f collectively adds a plurality of HeNBs (HeNBs 102 and 103 in this case) as communication partners, while communicating with HeNB 101. In the same figure, the same reference numerals (Sa1 to Sa3, Sa6 to Sa14, Sf6, Sf7, Sf9, and Sf12 to Sf15) are appended to portions corresponding to those shown in FIGS. 9 and 29, and description thereof is omitted here.

The sequence shown in FIG. 30 differs from that shown in FIG. 9 in that: sequences Sg4 and Sg5 are included in lieu of the sequences Sa4 and Sa5; sequences Sf6 and Sf7 are included between the sequences Sa1 and Sa8; a sequence Sf9 is included in parallel with the sequence Sa9; sequences Sf12 to Sf15 are included after the sequence Sa14; and the sequence Sa15 is not included. In the sequence Sg4, the CA requesting unit 212 of the mobile station device 105f transmits to HeNB 101, a request for carrier aggregation (CA request) including information identifying HeNB 102 and HeNB 103. In the sequence Sg5, upon receiving the request for carrier aggregation, the CA request processor 310 of HeNB 101 transmits to HeNB GW 104, a request for carrier aggregation (CA request) with respect to HeNB 102 and HeNB 103 indicated by information included in the received request.

Thus, even when only one component carrier is provided by HeNB 101, the mobile station device 105f becomes able to simultaneously communicate with HeNB 101 and a plurality of other base station devices (HeNB 102 and HeNB 103 in this case), thus making it possible to obtain an excellent transmission speed.

Additionally, a program for implementing part or whole of the functions of the mobile station device, the base station device, and the base station management device of each embodiment may be recorded on a computer-readable recording medium, so that a computer system can read and execute the program recorded on the recording medium to implement the mobile station device, the base station device, and the base station management device of each embodiment. Here, the "computer system" may include an OS and hardware such as peripheral devices.

Further, the "computer-readable recording medium" means a storage device, such as: a portable medium, for example, a flexible disk, a magneto optical disk, a ROM, or a CD-ROM; or a hard disk built in a computer system. Moreover, the "computer-readable recording medium" may also include a medium that dynamically stores a program for a short period, such as a communication line in a case where the program is transmitted via a network such as the Internet, or a communication line such as a telephone line. Additionally, the "computer-readable recording medium" may also include a medium that temporarily stores a program, such as a volatile memory included in a computer system which serves as a server or client in the above case. Further, the above program may be a program for implementing part of the above-described functions. Moreover, the above program may be a program that can implement the above-described functions in combination with the program already stored in the computer system.

Although the embodiments of the present invention have been described in detail above with reference to the drawings, the specific configuration is not limited to those embodiments, and design modifications without departing from the scope of the present invention are also included therein.

DESCRIPTION OF REFERENCE NUMERALS

100: wireless communication system
101, 102, 103: HeNB
104: HeNB GW
105: mobile station device
106: network
200, 201: transceiver unit
203: controller
204: memory unit
205: user interface
206, 207: transceiver antenna
210: necessity determining unit
211: cell search unit
212: CA requesting unit
213: connection processor
300: transceiver antenna
301: transceiver unit
302: controller
303: memory unit
304: communication unit
310: CA request processor
311: CA connection processor
400: controller
401: memory unit
402: communication unit
410: synchronizer
411: control signal relaying unit
412: data relaying unit

The invention claimed is:

1. A wireless communication system comprising:
a plurality of base station devices; and
a mobile station device configured to communicate with the plurality of base station devices,
wherein the mobile station device comprises:
a necessary determining unit configured to refer to a communication state of a first base station device that is a base station device in communication with the mobile station device, and determine necessity of carrier aggregation;
a cell search unit configured to, in a case that the necessity determining unit determines that carrier aggregation is necessary, search a communication available base station device from the plurality of base station devices;
a carrier aggregation requesting unit configured to, in a case that at least one communication available base station device is detected by the search, transmit a request for carrier aggregation to the first base station device;
an accessibility determining unit configured to, in a case that a communication available base station device is detected by the search, determining whether or not the mobile station device is accessible to the detected base station device; and
the carriage aggregation requesting unit is configured to transmit the request for carrier aggregation to the first base station device in a case that a communication available base station device is detected by the search, and the accessibility determining unit determines that the mobile station device is accessible to the detected base station device.

2. The wireless communication system according to claim 1, wherein the mobile station device comprises:
a peripheral base station information acquirer configured to acquire from the first base station device, information regarding a peripheral base station device capable of performing carrier aggregation, and
the cell search unit is configured to, at the time of the search, refer to the information regarding the peripheral base station device, which is acquired by the peripheral base station information acquirer.

3. The wireless communication system according to claim 2, further comprising:
a base station management device accessibly connected to the plurality of base station devices, wherein
the base station management device comprises:
a base station information acquirer configured to, in accordance with a request from the base station device, transmit information indicating a carrier aggregation available base station device among peripheral base station devices peripheral to the base station device having transmitted the request, the first base station device comprises:

a peripheral base station information acquirer configured to request and acquire from the base station device management device, information indicating a carrier aggregation available base station device among peripheral base station devices peripheral to the base station device; and a peripheral base station information provider configured to provide to the mobile station device, the information indicating the carrier aggregation available base station device, which is acquired by the peripheral base station information acquirer.

4. The wireless communication system according to claim 1, wherein the mobile station device comprises:

a mobile station connection processor configured to, upon receiving from the first base station device, a response to the request, perform a connection process with the detected base station device.

5. The wireless communication system according to claim 1, wherein the request for carrier aggregation includes information indicating at least one of the detected base station devices, the first base station device comprises:

a mobile station notifier configured to, upon receiving the request for carrier aggregation, transmit information indicating the mobile station device, to the base station device indicated by the information included in the request, and the base station device comprises:

a base station connection processor configured to, upon receiving from the first base station device, the information indicating the mobile station device, perform a connection process with the mobile station device.

6. The wireless communication system according to claim 5, wherein the mobile station notifier is configured to, in a case that the information included in the request for carrier aggregation indicates a plurality of detected base station devices, transmit the information indicating the mobile station device to each of the plurality of detected base station devices.

7. The wireless communication system according to claim 1, wherein the necessity determining unit is configured to, in a case that the mobile station device is communicating with a second base station device in addition to the first base station device, refer to a communication state of the second base station device and determine necessity of carrier aggregation.

8. The wireless communication system according to claim 1, wherein the request for carrier aggregation is peripheral cell information used for handover to a home base station device, the peripheral cell information being added with a bit indicating that the peripheral cell information is for carrier aggregation.

9. A wireless communication method for a wireless communication system including a plurality of base station devices, and a mobile station device configured to communicate with the plurality of base station devices, the wireless communication method comprising:

a first step for the mobile station device to refer to a communication state of a first base station device that is a base station device in communication with the mobile station device, and determine necessity of carrier aggregation;

a second step for the mobile station device to, in a case that it is determined in the first step that carrier aggregation is necessary, search a communication available base station device from the plurality of base station devices;

a third step for the mobile station device to, in a case that at least one communication available base station device is detected by the search, transmit a request for carrier aggregation to the first base station device;

fourth step for the mobile station device to, in a case that a communication available base station device is detected by the search, determine whether or not the mobile station device is accessible to the detected base station device; and a fifth step for the mobile station device to transmit the request for carrier aggregation to the first base station device in a case that a communication available base station device is detected by the search, and the determination is made that the mobile station device is accessible to the detected base station device.

10. A mobile station device configure to communicate with a plurality to base station devices the mobile station device comprising:

a necessity determining unit configured to refer to a communication state of a first base station device that is a base station device in communication with the mobile station device, and determine necessity of carrier aggregation;

a cell search unit configured to, in a case that the necessity determining unit determines that carrier aggregation is necessary, search a communication available base station device from the plurality of base station devices;

a carrier aggregation requesting unit configured to, in a case that at least one communication available base station device is detected by the search, transmit a request for carrier aggregation to the first base station device;

an accessibility determining unit configured to, in a case that a communication available base station device is detected by the search, determine whether or not the mobile station device is accessible to the detected base station device; and the carriage aggregation requesting unit is configured to transmit the request for carrier aggregation to the first base station device in a case that a communication available base station device is detected by the search, and the accessibility determining unit determines that the mobile station device is accessible to the detected base station device.

* * * * *